(12) United States Patent
Dennis et al.

(10) Patent No.: US 12,260,383 B2
(45) Date of Patent: *Mar. 25, 2025

(54) ATM-BASED ELECTRONIC PAYMENT CONVERSION SYSTEMS, METHODS, AND USER INTERFACES

(71) Applicant: PNC Global Transfers, Inc., Houston, TX (US)

(72) Inventors: Mark Dennis, Houston, TX (US); Miguel Angel Macias, Houston, TX (US); Jaime Caballero, Houston, TX (US)

(73) Assignee: PNC Global Transfers, Inc., Houston, TX (US)

( * ) Notice: Subject to any disclaimer, the term of this patent is extended or adjusted under 35 U.S.C. 154(b) by 518 days.

This patent is subject to a terminal disclaimer.

(21) Appl. No.: 17/671,130

(22) Filed: Feb. 14, 2022

(65) Prior Publication Data
US 2022/0164781 A1 May 26, 2022

Related U.S. Application Data

(63) Continuation of application No. 15/995,026, filed on May 31, 2018, now Pat. No. 11,282,053.

(51) Int. Cl.
*G06Q 20/10* (2012.01)
*G06Q 20/32* (2012.01)
(Continued)

(52) U.S. Cl.
CPC ....... *G06Q 20/1085* (2013.01); *G06Q 20/102* (2013.01); *G06Q 20/3255* (2013.01); *G06Q 20/385* (2013.01); *G07F 19/211* (2013.01)

(58) Field of Classification Search
CPC ............ G06Q 20/322; G06Q 20/3255; G06Q 20/1085; G06Q 20/22; G06Q 20/3223; G06Q 20/18; G07F 19/20
(Continued)

(56) References Cited

U.S. PATENT DOCUMENTS 9,311,632 B1 * 4/2016 Dent ................. G06Q 20/4015
10,354,246 B1 * 7/2019 Janiga .................. G07F 19/204
(Continued)

FOREIGN PATENT DOCUMENTS

IN 201721019473 12/2018

OTHER PUBLICATIONS

"2-Step Verification", GoToMyPC, https://twitter.com/GoToMyPC/status/745724781371203584, online (Year: 2016).
(Continued)

*Primary Examiner* — Paul S Schwarzenberg
*Assistant Examiner* — Mark A Malkowski
(74) *Attorney, Agent, or Firm* — ALG Intellectual Property, LLC

(57) ABSTRACT

An exemplary system includes at least one physical computing device that is communicatively coupled, by way of a network, to an automated teller machine (ATM), and that receives, by way of user input to the ATM, a transaction identifier, verifies that the transaction identifier represents, in an electronic payment system, an electronic payment of an amount from a sender to a recipient by way of the electronic payment system, generates an access code for the electronic payment, initiates a transmission of the access code to a computing device of the recipient, receives, by way of additional user input to the ATM, the access code for the electronic payment, validates the received access code for the electronic payment, and directs, in response to the validation of the received access code, the ATM to disburse the amount of the electronic payment in physical currency.

20 Claims, 14 Drawing Sheets

(51) Int. Cl.
*G06Q 20/38* (2012.01)
*G07F 19/00* (2006.01)

(58) Field of Classification Search
USPC .......................................................... 705/43
See application file for complete search history.

(56) References Cited

U.S. PATENT DOCUMENTS

| | | | |
|---|---|---|---|
| 10,839,655 B1* | 11/2020 | Borchardt | G07F 19/2055 |
| 11,348,077 B2* | 5/2022 | Naik | G06Q 20/1085 |
| 2007/0045395 A1* | 3/2007 | Corona | G06Q 20/10 |
| | | | 235/379 |
| 2007/0203850 A1* | 8/2007 | Singh | G07F 19/207 |
| | | | 705/67 |
| 2010/0042539 A1* | 2/2010 | Dheer | G06Q 20/102 |
| | | | 705/40 |
| 2011/0238573 A1 | 9/2011 | Varadarajan | |
| 2012/0047070 A1 | 2/2012 | Pharris | |
| 2012/0197797 A1* | 8/2012 | Grigg | G06Q 20/1085 |
| | | | 705/43 |
| 2012/0239579 A1 | 9/2012 | Wolfs et al. | |
| 2012/0310824 A1* | 12/2012 | Liberty | G06Q 20/326 |
| | | | 705/40 |
| 2013/0173390 A1* | 7/2013 | Polo | G06Q 30/02 |
| | | | 705/14.58 |
| 2013/0226799 A1* | 8/2013 | Raj | G06Q 20/401 |
| | | | 705/44 |
| 2014/0008431 A1* | 1/2014 | Patel | G07F 19/202 |
| | | | 705/45 |
| 2014/0058862 A1* | 2/2014 | Celkonas | G06Q 20/12 |
| | | | 705/18 |
| 2014/0136408 A1* | 5/2014 | Andrews | G06Q 30/01 |
| | | | 705/42 |
| 2015/0227913 A1* | 8/2015 | Ballout | G06Q 20/04 |
| | | | 705/42 |
| 2015/0287018 A1* | 10/2015 | Iqbal | G06Q 20/3221 |
| | | | 705/44 |
| 2016/0063481 A1* | 3/2016 | Gupta | G06Q 20/3223 |
| | | | 705/72 |
| 2016/0125368 A1 | 5/2016 | Grassadonia | |
| 2017/0262823 A1* | 9/2017 | Hartung | G06Q 20/1085 |
| 2018/0047000 A1* | 2/2018 | Kuchenski | G06Q 20/3821 |
| 2019/0073663 A1* | 3/2019 | Jamkhedkar | G06Q 20/325 |

OTHER PUBLICATIONS

"Text Message Banking", mfbusa, https://web.archive.org/web/20170312191116/https://www.mfbusa.com/TEXTMESSAGE1.pdf, online (Year: 2017).

"M-Pesa ATM withdrawl", BrokenKe, https://www.youtube.com/watch?v=Q-CRSmkXNzg, online (Year: 2012).

* cited by examiner

ATM-BASED ELECTRONIC PAYMENT CONVERSION SYSTEMS, METHODS, AND USER INTERFACES

RELATED APPLICATIONS

This application is a continuation application of U.S. patent application Ser. No. 15/995,026, filed May 31, 2018, which is hereby incorporated by reference in its entirety.

BACKGROUND INFORMATION

An automated teller machine (ATM) is a computer-implemented banking outlet that allows bank customers with bank accounts to complete basic transactions without the aid of a branch representative. Typically, a bank customer uses a bank-issued credit or debit card to authenticate to and use an ATM to deposit money into or withdraw money from the bank customer's bank account. Due to technical limitations, a conventional ATM provides a limited set of basic transactions accessible only by bank customers who have bank accounts that can be used for the basic transactions. Technical solutions are desired that provide additional options through an ATM.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
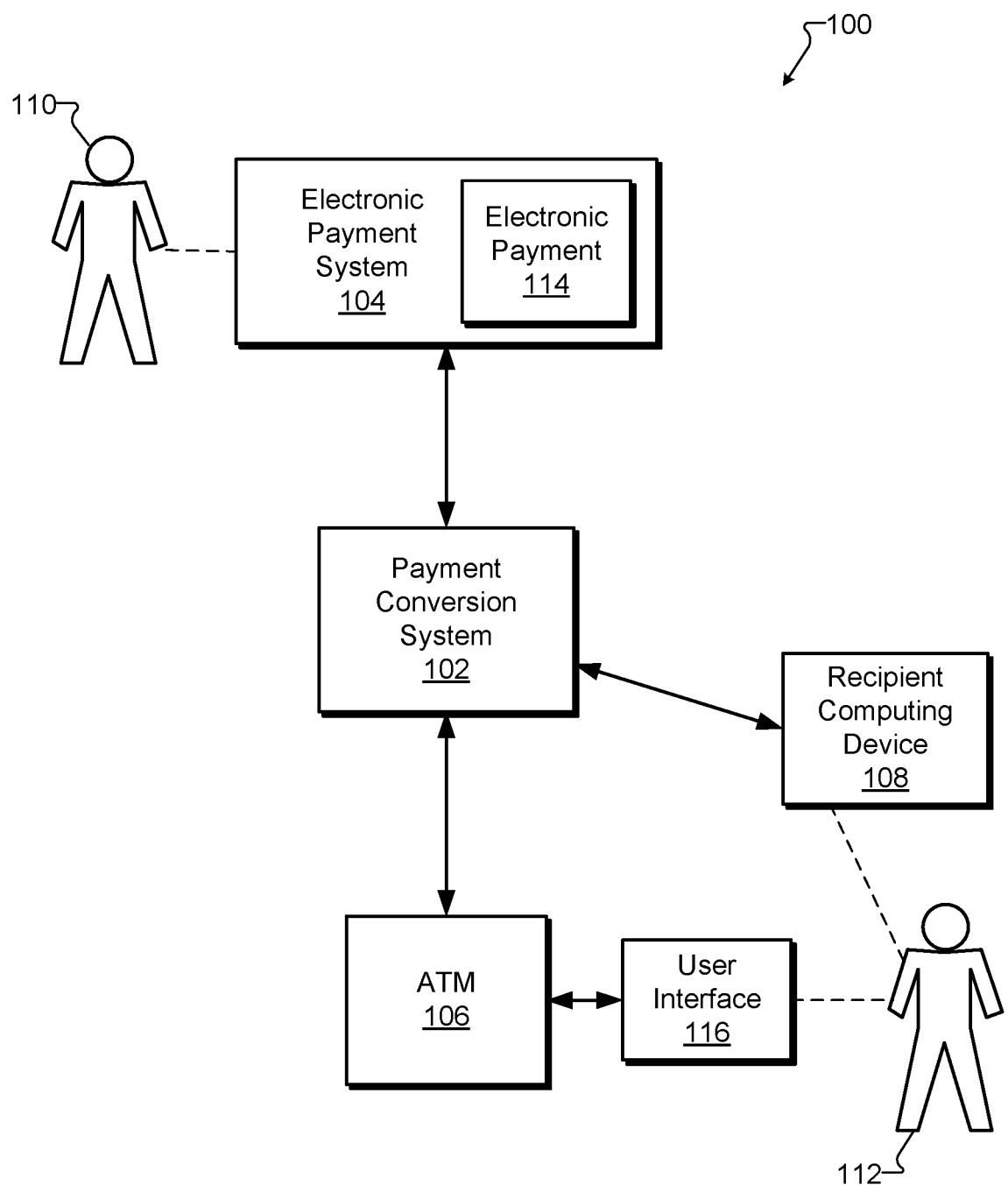
FIG. 1 illustrates an exemplary configuration in which a payment conversion system is implemented according to principles described herein.

ATM-based electronic payment conversion systems, methods, and user interfaces are described herein. As will be described in more detail below, ATM-based electronic payment conversion systems, methods, and user interfaces described herein facilitate conversion of virtual funds of electronic payments to physical currency that is disbursed by way of an ATM. In one embodiment, for example, a payment conversion system detects an electronic payment from a sender to a recipient in an electronic payment system and provides a payment notification to the recipient (e.g., by initiating a transmission of the payment notification to a computing device associated with the recipient, such as by initiating a transmission of a short messaging service (SMS) message to a mobile directory number (MDN) of a mobile computing device associated with the recipient). The payment notification, which includes a transaction identifier for the electronic payment, is presented by the computing device to the recipient. The payment conversion system receives the transaction identifier by way of user input to an ATM and verifies that the received transaction identifier represents the electronic payment. In response, the payment conversion system generates an access code for the electronic payment and provides the access code to the recipient (e.g., by initiating a transmission of the access code to the computing device associated with the recipient, such as by initiating a transmission of another SMS message to the MDN of the mobile computing device associated with the recipient). The access code is presented by the computing device to the recipient. The payment conversion system receives the access code by way of additional user input to the ATM and validates the received access code. In response, the payment conversion system converts the electronic payment to physical currency, including directing the ATM to disburse the physical currency.

By converting electronic payments to physical currency in this or a similar manner, ATM-based electronic payment conversion systems, methods, and user interfaces described herein may facilitate efficient, automated, and/or secure conversion of electronic payments to physical currency. In certain examples, ATM-based electronic payment conversion systems, methods, and user interfaces described herein may convert an electronic payment into physical currency without use of a bank account of the recipient and/or without requiring the recipient to register with or provide sensitive information to an electronic payment service that processed the electronic payment. This is in contrast to conventional electronic payment systems in which options for transferring virtual funds of an electronic payment out of the electronic payment system are limited. For example, certain conventional electronic payment systems are limited to electronically transferring virtual funds to a bank account of the recipient (e.g., directly to the bank account or using a bank debit card linked to the bank account) that has been linked to the electronic payment system or mailing a physical check to the recipient. These options require the recipient to provide, and the electronic payment system to safeguard, sensitive information such as recipient banking information, debit card information, and/or mailing address information.

Accordingly, ATM-based electronic payment conversion systems, methods, and user interfaces described herein may improve and/or enhance electronic payment systems, such as by expanding the usability and/or the accessibility of conventional electronic payment systems. Additionally or alternatively, ATM-based electronic payment conversion systems, methods, and user interfaces described herein may improve and/or enhance ATMs, such as by expanding the features and/or services of conventional ATMs (e.g., by facilitating use of an ATM to receive an electronic payment as physical currency). In this or a similar manner, ATM-based electronic payment conversion systems, methods, and user interfaces described herein provide a technical solution to one or more technical problems of conventional electronic payment systems and/or ATMs and/or improve operations of electronic payment systems and/or ATMs.

These and/or other benefits and/or advantages that may be provided by the systems, methods, and user interfaces described herein will be made apparent by the following detailed description.

FIG. 1 illustrates an exemplary configuration 100 in which a payment conversion system 102 is implemented. As shown, configuration 100 includes payment conversion system 102 communicatively coupled to an electronic payment system 104, an ATM 106, and a recipient computing device 108 (recipient device 108). Payment conversion system 102 may be configured to communicate with electronic payment system 104, ATM 106, and recipient device 108 using any suitable communication technologies, including network communication technologies. While payment conversion system 102 is shown to be separate from and communicatively coupled to electronic payment system 104 and ATM 106 in FIG. 1, one or more components of payment conversion system 102 may be integrated within electronic payment system 104 and/or ATM 106 in other configurations.

In configuration 100, a sender 110 may interact with electronic payment system 104 to send an electronic payment by way of electronic payment system 104, and a recipient 112 of an electronic payment processed by electronic payment system 104 may interact with ATM 106 and recipient device 108 to facilitate conversion, by payment conversion system 102, of the electronic payment to physical currency that may be disbursed to recipient 112 by ATM 106. Sender 110 may be any person or entity that initiates an electronic payment by way of electronic payment system 104. Recipient 112 may be any person or entity that receives an electronic payment by way of electronic payment system 104.

Recipient device 108 may include any computing device associated with (e.g., operated by) recipient 112 and capable of receiving communications from payment conversion system 102 and presenting those communications to recipient 112. Recipient device 108 may include a mobile device (e.g., a tablet computer, a smartphone device, a cell phone device, etc.) or other suitable computing device that may be used by recipient 112 to receive communications from payment conversion system 102, such as SMS messages sent by payment conversion system 102 to an MDN of recipient device 108 in some examples.

Electronic payment system 104 may include one or more physical computing devices (e.g., servers, data stores, etc.) configured to perform the operations of electronic payment system 104 described herein. Electronic payment system 104 is configured to process electronic payments by transferring electronically-represented virtual funds from payment senders to payment recipients. An electronic payment may include any form of an electronically-processed payment of an amount, i.e., a transfer of electronically-represented virtual funds, from a payment sender to a payment recipient. For example, an electronic payment may include a payment made through an online payment service, a money wire, a mobile wallet payment, or any other form of electronic payment. Virtual funds may include any electronic representation of money maintained by electronic payment system 104.

Electronic payment system 104 may facilitate sender 110 initiating an electronic payment to recipient 112 in any suitable way. For example, sender 110 may provide funds for the electronic payment to electronic payment system 104, and electronic payment system 104 may represent the funds as virtual funds associated with sender 110. Sender 110 may submit a recipient identifier (e.g., an MDN of recipient device 108) that uniquely identifies recipient 112 and/or recipient device 108 and request that an electronic payment of a certain amount be made to recipient 112 and/or recipient device 108.

In response, electronic payment system 104 may process the electronic payment, including transferring the virtual funds for the amount of the payment from sender 110 to recipient 112. After the virtual funds are transferred, electronic payment system 104 may represent the funds as virtual funds associated with recipient 112.

In certain examples, electronic payment system 104 may generate a transaction identifier for the electronic payment. The transaction identifier may be any suitable form of identifier that is useable to identify the electronic payment. For example, the transaction identifier may be a confirmation number or other transaction identifier that, within electronic payment system 104, uniquely represents the electronic payment.

Electronic payment system 104 may generate and maintain a record of the electronic payment. The record may include any information associated with the electronic payment, including the transaction identifier for the electronic payment, the amount of the payment, a sender identifier for the sender 110 of the payment, a recipient identifier for the recipient 112 of the payment, a geographic location associated with the payment, a time and date associated with the payment, and/or any other information associated with the electronic payment. Electronic payment system 104 may maintain the record of the electronic payment in any suitable form, including as a data record of the electronic payment. In FIG. 1, a record of the electronic payment is represented as electronic payment 114.

ATM 106 may include a physical computing device configured to perform the operations of ATM 106 described herein. ATM 106 is configured to communicate with payment conversion system 102 and to provide a user interface 116 by way of which recipient 112 may interact with ATM 106 to authenticate to ATM 106 and/or payment conversion system 102 and to request conversion of the electronic payment to physical currency. ATM 106 may distribute the physical currency to recipient 112. ATM 106 may be included in a network, system, or alliance of ATMs. Operations of and examples of user interface 116 provided by ATM 106 are described in more detail herein.

Payment conversion system 102 may include one or more physical computing devices (e.g., servers, data stores, etc.) configured to perform the operations of payment conversion system 102 described herein. Payment conversion system 102 is configured to facilitate conversion of an electronic payment to physical currency. For example, payment conversion system 102 may perform operations to facilitate conversion of an electronic payment from sender 110 to recipient 112 to physical currency that is disbursed to recipient 112 by way of ATM 106. Examples of such operations, which include operations in which payment conversion system 102 communicates with recipient device 108 to facilitate authentication of recipient 112 to ATM 106 and/or payment conversion system 102, are described in detail herein.

Figure 2:
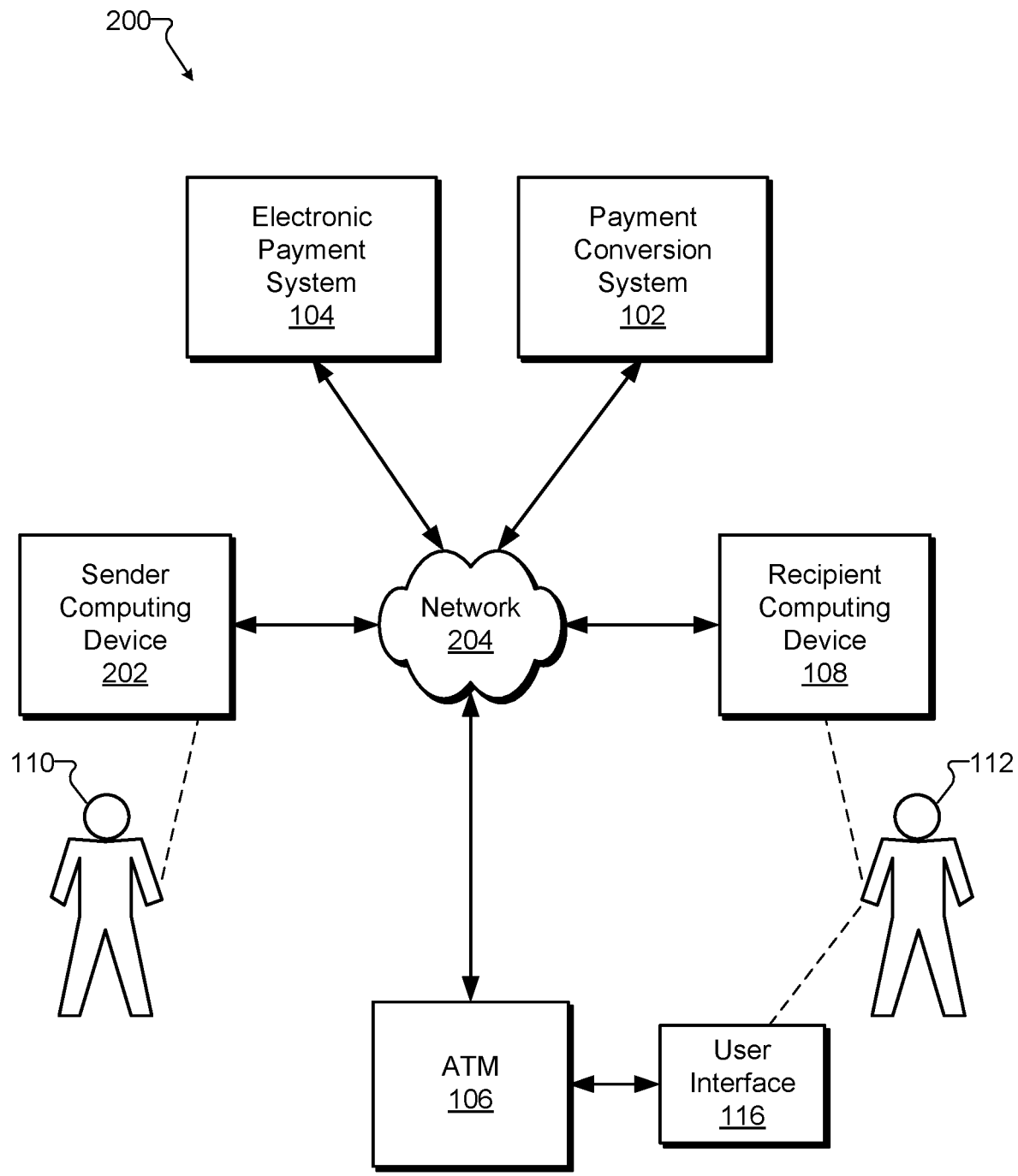
FIG. 2 illustrates another exemplary configuration in which a payment conversion system is implemented according to principles described herein.

FIG. 2 illustrates another exemplary configuration 200 in which payment conversion system 102 is implemented. As shown, configuration 200 includes payment conversion system 102, electronic payment system 104, ATM 106, recipient device 108, and a sender computing device 202 (sender device 202) communicatively coupled to a network 204. Payment conversion system 102 may be configured to communicate with electronic payment system 104, ATM 106, and recipient device 108 over network 204 using any suitable communication technologies (e.g., network connections). While payment conversion system 102 is shown to be separate from and communicatively coupled to electronic payment system 104 and ATM 106 in FIG. 1, one or more components of payment conversion system 102 may be integrated within electronic payment system 104 and/or ATM 106 in other configurations.

Network 204 may include a wired or wireless network (e.g., a cable or satellite carrier network or a mobile telephone network), the Internet, a wide area network, a local area network, or any other suitable communications network or combination of communication networks. Data may be transmitted and received over network 204 (e.g., by way of one or more network connections) using any suitable data communication technologies, devices, media, and protocols.

Sender device 202 may include any computing device associated with (e.g., operated by) sender 110 and capable of communicating with electronic payment system 104 by way of network 204. Sender device 202 may include a personal computer (e.g., a desktop or laptop computer), a mobile device (e.g., a tablet computer, a smartphone device, a cell phone device, etc.), or other suitable computing device that may be used by sender 110 to interact with electronic payment system 104. In certain examples, an application associated with electronic payment system 104 may be installed and executed on sender device 202 to facilitate interaction of sender 110 with electronic payment system 104.

Sender 110 may use sender device 202 to interact with electronic payment system 104 to initiate an electronic payment from sender 110 to recipient 112. For example, electronic payment system 104 may implement an online transaction platform that provides an online payment service by way of which sender 110 may transfer virtual funds to recipient 112. The online payment platform may provide a user interface, such as a web site or mobile application, that may be accessed by sender device 202 and used by sender 110 to make a payment to recipient 112.

To prepare to make an electronic payment by way of the online payment service, sender 110 may register with the online payment service, such as by creating an account with the online payment service, establishing credentials for authenticating to the online payment service (e.g., login credentials such as a user name and password), and funding the account. Sender 110 may fund the account in any suitable way, such as by depositing funds to the account in any suitable way and/or by linking a bank account, a debit card, a credit card, or other source of funds to the account.

After sender 110 is registered with the online payment service and the online payment service account of sender 110 is funded or linked to a source of funds, sender 110 may interact with a user interface of the online payment platform to request that a payment of an amount be made to recipient 112. The online payment platform may require that sender 110 provide a unique identifier for recipient 112 (a "recipient identifier") that may be used by the online payment platform to identify and/or authenticate recipient 112. In certain examples, recipient 112 may be a registered user of the service. In other examples, recipient 112 may not be a registered user of the service, as will be described herein.

The recipient identifier may be in any form suitable for uniquely identifying recipient 112. In certain example, the recipient identifier includes an MDN of recipient device 108, which may be a mobile phone device. Other unique recipient identifiers, such as an e-mail or another messaging address of recipient 112, a user name of recipient 112 with the online payment platform, or a social media platform address of recipient 112, may be used in other examples.

The online payment platform may process the requested electronic payment by transferring virtual funds from the account of sender 110 to recipient 112. If recipient 112 has an established account with the online payment service, the virtual funds may be transferred to the account of recipient 112. If recipient 112 does not have an established account with the online payment service, the online payment platform may establish or use a temporary account and transfer the virtual funds to the temporary account.

ATM 106 provides user interface 116 that recipient 112 may interact with to request that the virtual funds of the electronic payment be converted to physical currency and distributed to recipient 112. Examples of user interface 116 are described herein.

In response to the request that the virtual funds of the electronic payment be converted to physical currency and distributed to recipient 112, payment conversion system 102 may perform operations to facilitate conversion of the virtual funds of the electronic payment to physical currency that is disbursed to recipient 112 by way of ATM 106. Examples of such operations, which include operations in which payment conversion system 102 communicates with recipient device 108 to facilitate authentication of recipient 112 to ATM 106 and/or payment conversion system 102, are described herein.

While configurations 100 and 200 each show a single electronic payment system 104, other configurations may include one or more additional electronic payment systems, such as one or more electronic payment systems operated by different organizations. In such configurations, payment conversion system 102 may be configured to communicate with each of the different electronic payment systems such that payment conversion system 102 provides an open platform that concurrently supports multiple different electronic payment systems. Thus, operations of payment conversion system 102 described herein in reference to electronic payment system 104 may apply to payment conversion system 102 interacting with electronic payment system 104 and/or with any other electronic payment systems.

Figure 3:
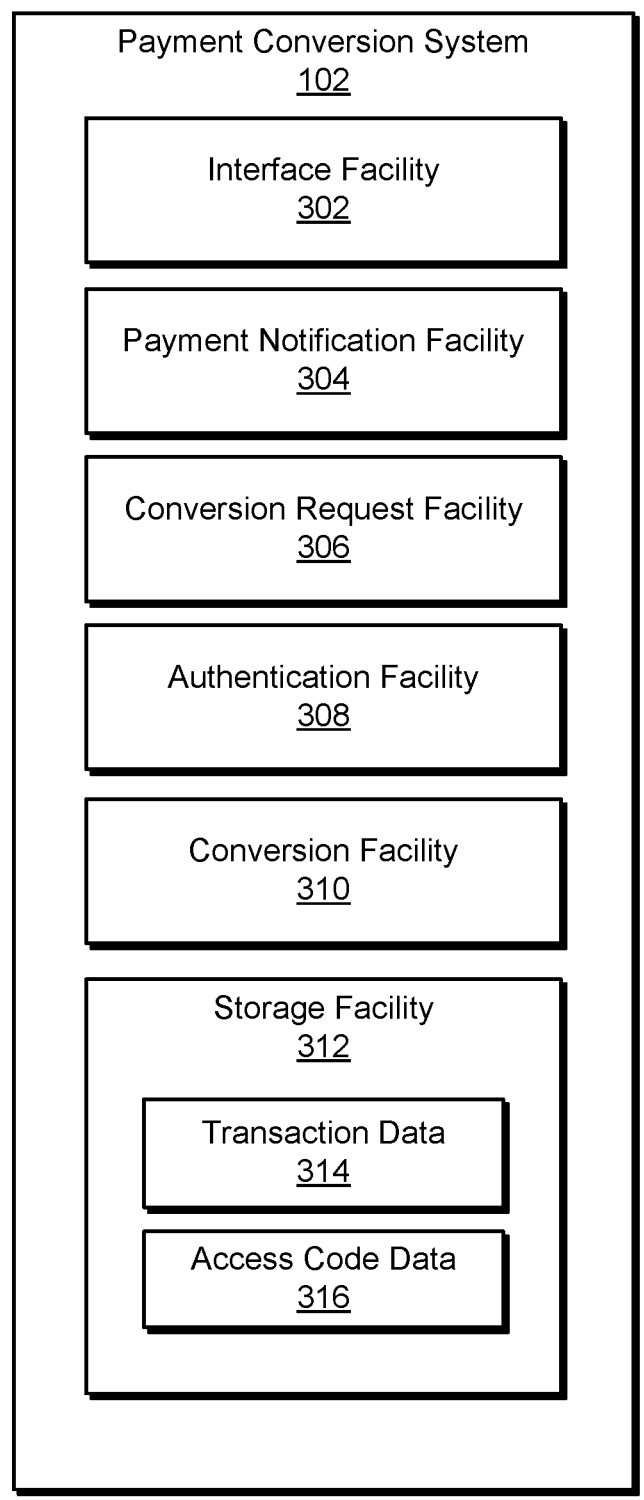
FIG. 3 illustrates an exemplary payment conversion system according to principles described herein.

FIG. 3 illustrates an exemplary implementation of payment conversion system 102 configured to perform the various operations of payment conversion system 102 described herein. Payment conversion system 102 may include, without limitation, an interface facility 302, a payment notification facility 304, a conversion request facility 306, an authentication facility 308, a conversion facility 310, and a storage facility 312 selectively and communicatively coupled to one another. It will be recognized that although facilities 302-312 are shown to be separate facilities in FIG. 3, any of facilities 302-312 may be combined into a single facility or divided into more facilities as may serve a particular implementation. Facilities 302-312 may be implemented as software, hardware, firmware, or any suitable combination thereof.

Interface facility 302 may provide one or more interfaces for communicating with electronic payment system 104, ATM 106, and recipient device 108. In certain examples, the interfaces may support sending and receiving of communications over network 204. Interface facility 302 may implement any data communications interface technologies for use in communicating with electronic payment system 104, ATM 106, and recipient device 108. For example, interface facility 302 may implement or utilize a set of application program interfaces (APIs) to communicate with electronic payment system 104 and/or ATM 106, including to receive a notification of an electronic payment from electronic payment system 104, query electronic payment system 104 for an electronic payment, access data representative of an identified electronic payment, and notify electronic payment system 104 of a conversion of an electronic payment to physical funds. In certain examples, interface facility 302 may be configured to communicate with recipient device 108 by initiating a transmission of a message (e.g., an SMS message) to recipient device 108 (e.g., to an MDN of recipient device 108). Examples of APIs that may be implemented and communications that may be sent and received by payment conversion system 102 are described herein.

In certain examples, interface facility 302 utilizes multiple different application program interfaces to access data from and/or send communications to multiple different electronic payment systems operated by multiple different organizations. In certain examples, interface facility 302 utilizes multiple different application program interfaces to communicate with multiple different ATMs (e.g., multiple different ATM networks or alliances) operated by multiple different organizations.

Payment notification facility 304 is configured to detect an electronic payment processed by electronic payment system 104 and provide a notification of the electronic payment to a recipient of the electronic payment. Payment notification facility 304 may detect an electronic payment processed by electronic payment system 104 in any suitable way, including by receiving a communication from electronic payment system 104 or accessing data from electronic payment system 104. Payment notification facility 304 may process the received communication or accessed data to identify an electronic payment processed by electronic payment system 104, such as an electronic payment from sender 110 to recipient 112.

Payment notification facility 304 may access data representative of the detected electronic payment from electronic payment system 104. For example, payment notification facility 304 may access a data record of the electronic payment or certain information included in the data record. Payment notification facility 304 may include any accessed information about the electronic payment in a payment notification, such as a transaction identifier for the electronic payment.

Payment notification facility 304 may provide a notification of the detected electronic payment to the recipient of the electronic payment in any suitable way, including by initiating a transmission of the payment notification to recipient device 108. In certain examples, payment notification facility 304 may direct interface facility 302 to initiate a transmission of the payment notification to recipient device 108, such as by initiating a transmission of a payment notification SMS message to an MDN of recipient device 108.

Payment notification facility 304 may use information accessed from electronic payment system 104 to determine a target destination of the payment notification. In certain implementations, for example, the sender of the electronic payment may input a recipient identifier such as an MDN of recipient device to identify recipient 112 as the intended recipient of the electronic payment. Payment notification facility 304 may access the recipient identifier from electronic payment system 104 and use the recipient identifier as a target destination of the payment notification.

The payment notification may be configured to be received, processed, and presented by recipient device 108. Recipient device 108 may present the payment notification in any suitable way, such as by presenting the payment notification in a graphical user interface view displayed on a display screen of recipient device 108.

Figure 4:
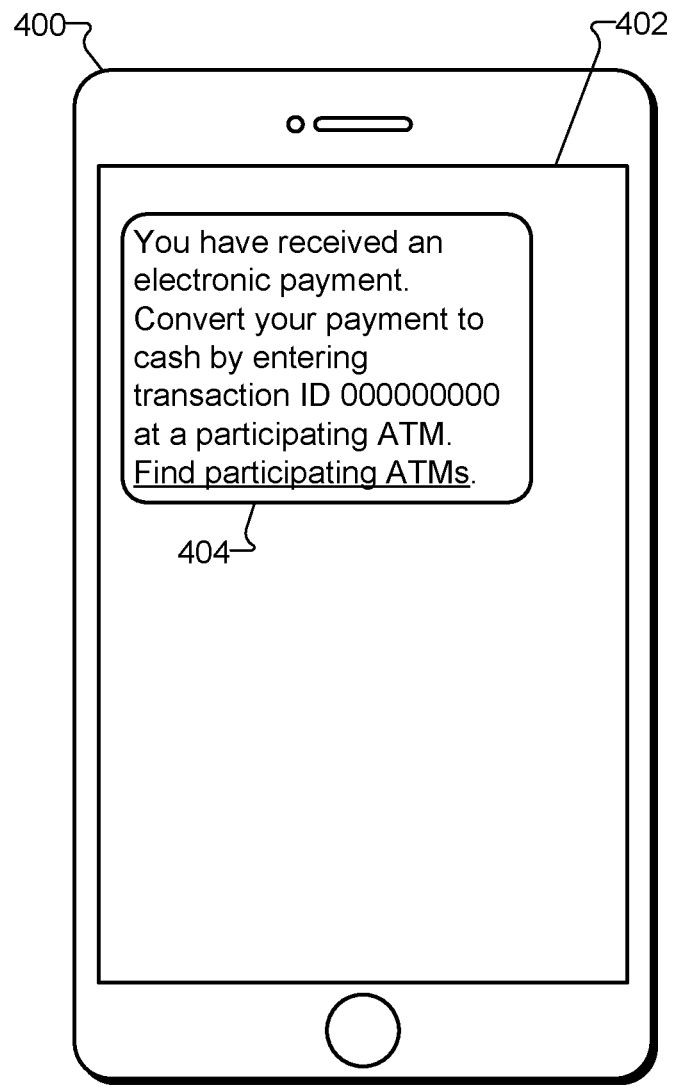
FIG. 4 illustrates an exemplary graphical user interface view displayed by a mobile computing device according to principles described herein.

FIG. 4 illustrates a recipient device in the form of a mobile computing device 400 displaying an exemplary graphical user interface view 402 that presents a payment notification 404. In the illustrated example, payment notification 404 is presented as an SMS message that notifies recipient 112 of the electronic payment, indicates a transaction identifier of the electronic payment, indicates how to convert the electronic payment to physical currency, and provides a link to information about ATM locations at which recipient 112 may request to convert the electronic payment to physical currency. A payment notification may be received and presented by a computing device of recipient 112 in any other suitable way in other examples.

Having been notified of the electronic payment, recipient 112 may physically visit and interact with ATM 106 to request that the electronic payment be converted to physical currency. For example, recipient 112 may provide user input to ATM 106 to request that the electronic payment be converted to physical currency, such as by selecting an appropriate ATM menu option included in user interface 116 of ATM 106 to initiate the request.

Returning to FIG. 3, conversion request facility 306 is configured to receive a request to convert an electronic payment to physical currency, receive a transaction identifier for the electronic payment, and verify that the transaction identifier represents the electronic payment. Conversion request facility 304 may receive, by way of ATM 106, a request to convert an electronic payment to physical currency. For example, when recipient 112 interacts with ATM 106 to request that the electronic payment be converted to physical currency, conversion request facility 304 may receive the request by detecting the request made at ATM 106, receiving a notification of the request from ATM 106, or in any other suitable way.

Conversion request facility 304 may receive a transaction identifier by way of ATM 106. In certain examples, this may include conversion request facility 304 prompting for entry of a transaction identifier in response to conversion request facility 304 receiving a request to convert an electronic payment to physical currency. Conversion request facility 304 may provide a prompt for entry of a transaction identifier in any suitable way, such as by providing a graphical user interface view, for display by ATM 106, that prompts recipient 112 to provide the transaction identifier for the electronic payment.

Figure 5:
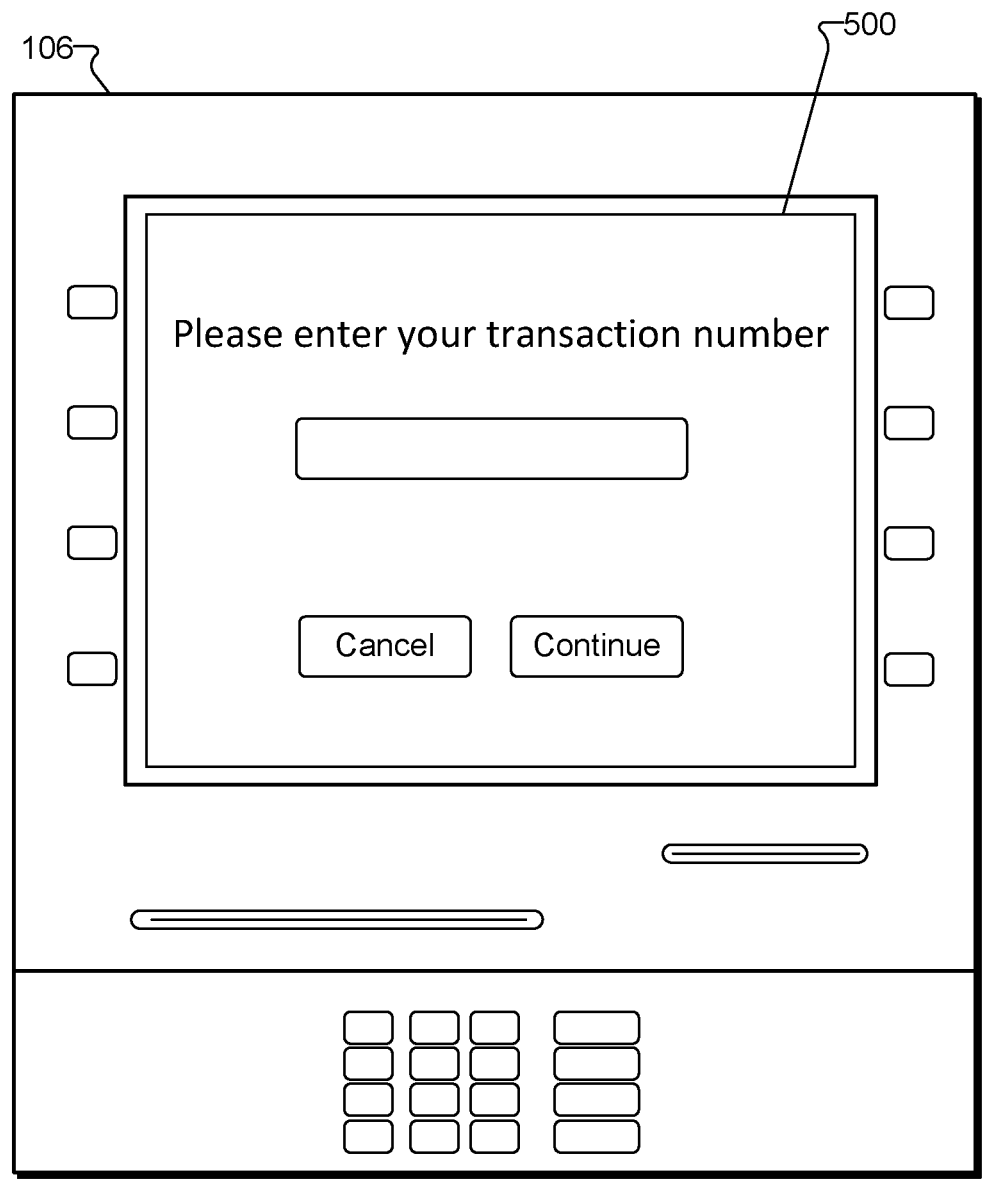
FIG. 5 illustrates an exemplary graphical user interface view displayed by an ATM according to principles described herein.

FIG. 5 illustrates ATM 106 displaying an exemplary graphical user interface view 500 that prompts recipient 112 to input a transaction identifier for an electronic payment. Recipient 112 may input the transaction identifier in any suitable way (e.g., by using a keypad, microphone, or other input mechanism of ATM 106 to provide user input representing the transaction identifier), and conversion request facility 304 may receive the transaction identifier provided to ATM 106.

Conversion request facility 304 may verify that the transaction identifier received by way of ATM 106 represents an electronic payment. For example, conversion request facility 304 may query a data store of electronic payments (e.g., a data store maintained by electronic payment system 104 or payment conversion system 102) for an electronic payment with a matching transaction identifier. If a match is found, payment conversion system 102 verifies that the transaction identifier received by way of ATM 106 represents an electronic payment having a matching transaction identifier in the data store.

Authentication facility 308 is configured to authenticate recipient 112. For example, in response to conversion request facility 304 verifying that the transaction identifier received by way of ATM 106 represents an electronic payment processes by electronic payment system 104, authentication facility 308 may generate an access code for the electronic payment, provide the access code to recipient 112, receive the access code by way of additional user input to ATM 106, and validate the access code received by way of ATM 106.

Authentication facility 308 may generate an access code for the electronic payment. The access code may be in any suitable form, such as a one-time passcode for the electronic payment.

Authentication facility 308 may provide the access code to recipient 112 in any suitable way. In certain examples, authentication facility 308 provides the access code to recipient by initiation a transmission of the access code to recipient device 108. For example, authentication facility 308 may initiate a transmission of an SMS message containing the access code to the MDN of recipient device 108.

The access code may be configured to be received, processed, and presented by recipient device 108. Recipient device 108 may present the access code in any suitable way, such as by presenting the access code in a graphical user interface view displayed on a display screen of recipient device 108.

Figure 6:
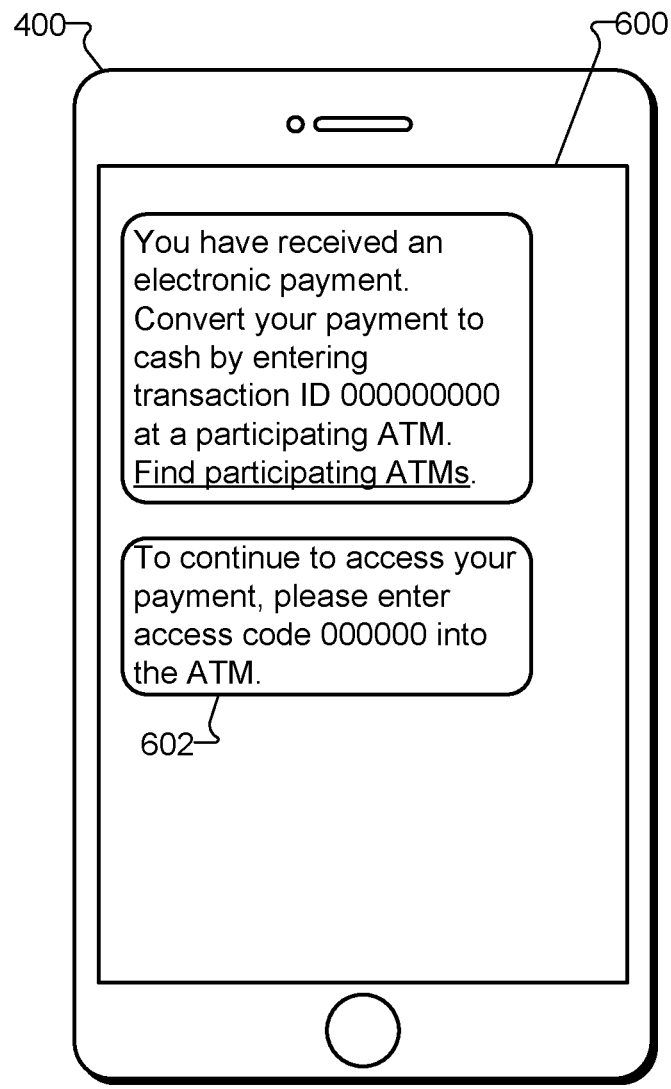
FIG. 6 illustrates another exemplary graphical user interface view displayed by a mobile computing device according to principles described herein.

FIG. 6 illustrates a recipient device in the form of mobile computing device 400 displaying an exemplary graphical user interface view 600 that presents a notification 602 containing the access code. In the illustrated example, notification 602 is presented as an SMS message that notifies recipient 112 of the access code for the electronic payment and instructs recipient to enter the access code into ATM 106. An access code may be received and presented by a computing device of recipient 112 in any other suitable way in other examples.

Figure 7:
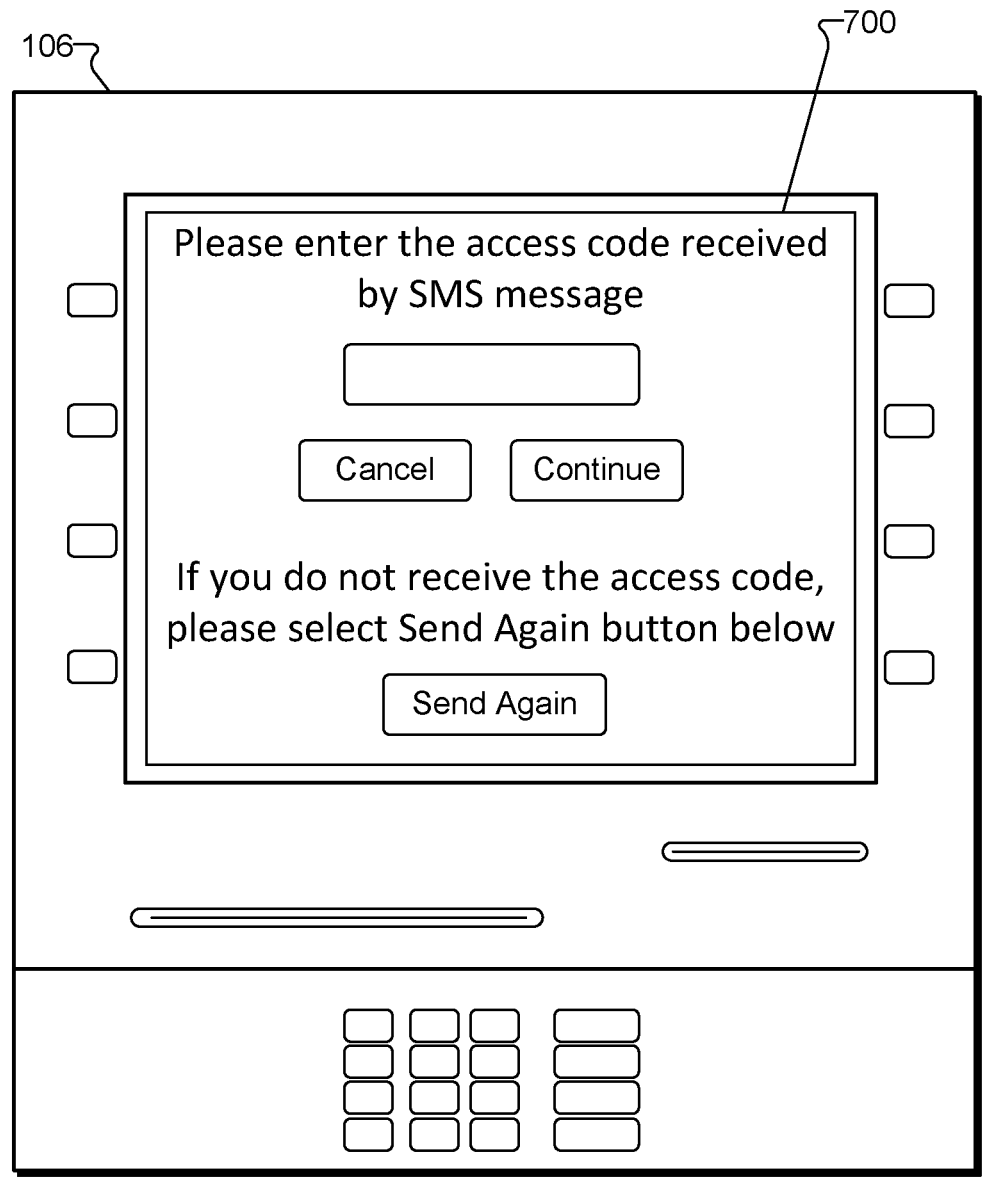
FIG. 7 illustrates another exemplary graphical user interface view displayed by an ATM according to principles described herein.

Having been notified of the access code through recipient device 108, recipient 112 may provide the access code to ATM 106. To this end, ATM 106 may display a graphical user interface view that recipient may interact with to provide user input representing the access code. FIG. 7 illustrates ATM 106 displaying an exemplary graphical user interface view 700 that prompts recipient 112 to input the access code for the electronic payment. Recipient 112 may input the access code in any suitable way (e.g., by using a keypad, microphone, or other input mechanism of ATM 106 to provide user input representing the access code). As shown, graphical user interface view 700 also indicates how recipient 112 should receive the access code (e.g., by SMS message) and prompts recipient 112 to select a "Send Again" button if the access code is not received.

Authentication facility 308 receives the access code by way of ATM 106 and validates received access code. Authentication facility 308 may validate the access code by verifying that the access code received by way of ATM 106 matches the access code generated by authentication facility 308 for the electronic payment. If a match is found, authentication facility 308 validates the access code received by way of ATM 106.

In this manner, authentication facility 308 may authenticate recipient 112 and/or recipient device 108 to ATM 106 and/or payment conversion system 102. As described, the authentication may be performed in real time using only recipient device 108 for authentication as recipient 112 interacts with ATM 106. Such authentication may facilitate efficient, automated, and/or secure conversion of an electronic payment to physical currency without requiring use of a bank account or credit/debit card of recipient 112 and/or without requiring interaction with a human bank teller or store cashier.

In response to authentication of recipient 112 by authentication facility 308, conversion facility 310 converts the electronic payment to physical currency. Conversion facility 310 may perform one or more operations to process the conversion. For example, conversion facility 310 may direct ATM 106 to disburse the physical currency (e.g., as bills and/or coins). The disbursed physical currency may equal all or a portion of the amount of the electronic payment. Conversion facility 310 may perform one or more settlement operations and/or direct ATM 106 to perform one or more settlement operations to complete the conversion of the electronic payment to physical currency. For example, conversion facility 301 may provide a conversion notification to electronic payment system 104 to notify electronic payment system 104 that the electronic payment has been converted to physical funds disbursed to recipient by way of ATM 106. Accordingly, electronic payment system 104 may perform one or more settlement operations, such as compensating an organization associated with ATM 106 for the disbursement of the physical currency or arranging such compensation to be provided by a source of funds associated with sender 110, for example.

Returning to FIG. 3, storage facility 312 may maintain (e.g., store within memory of a computing device that implements payment conversion system 102) various types of data received, generated, managed, used, and/or transmitted by facilities 302-310. For example, storage facility 312 may maintain data representative of data accessed by facilities 302-310 from one or more sources, such as transaction data 314 representative of information (e.g., transaction identifiers, recipient identifiers, etc.) about electronic payments accessed from electronic payment system 104 and/or received by way of ATM 106, access code data 316 generated by payment conversion system 102 and/or received by way of ATM 106, and/or any other data generated or used by payment conversion system 102. Exemplary data described herein may be stored by storage facility 312 for use by payment conversion system 102. Storage facility 312 may maintain additional or alternative data as may serve a particular implementation.

Figure 8:
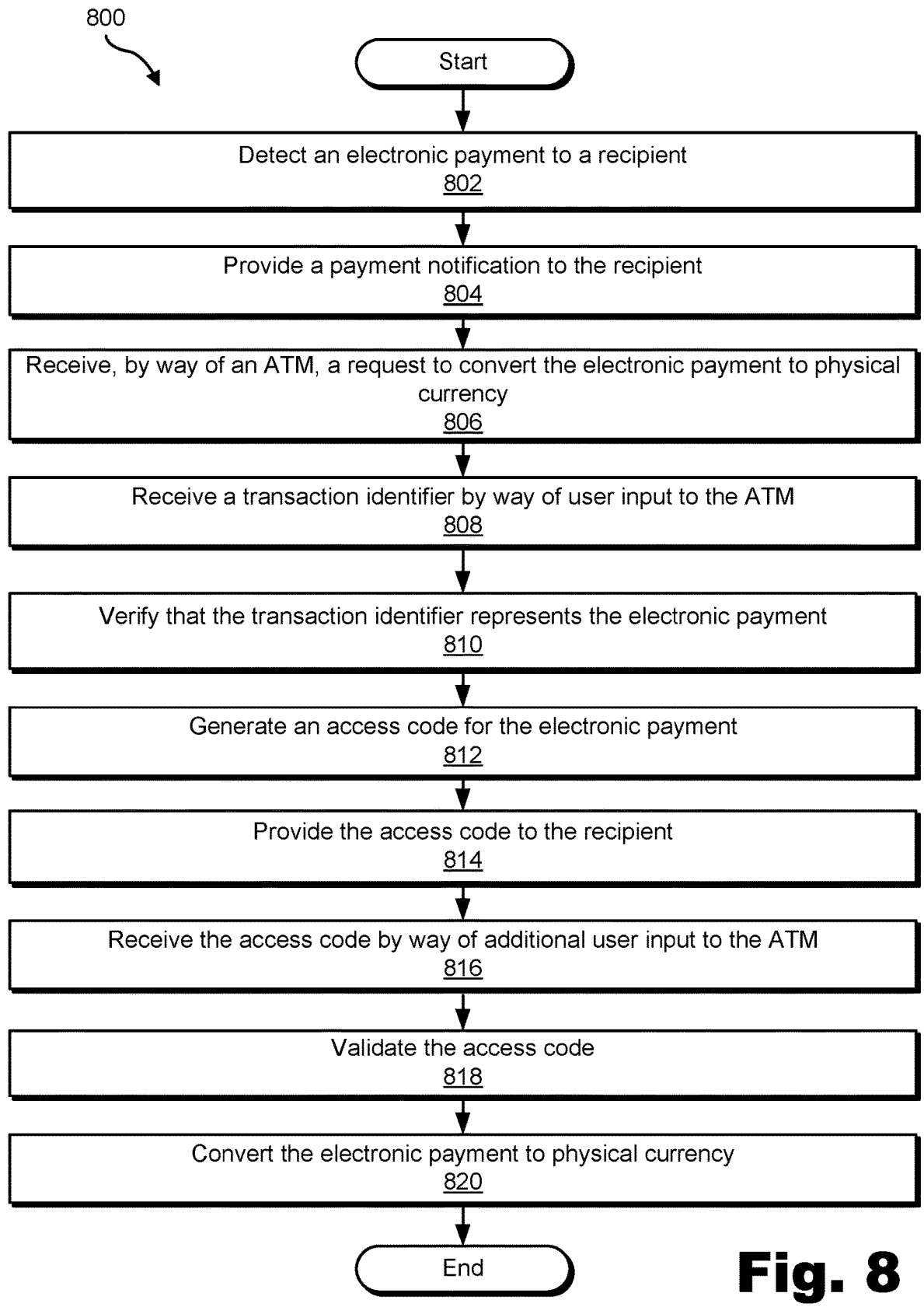
FIG. 8 illustrates an exemplary payment conversion method according to principles described herein.

FIG. 8 illustrates an exemplary ATM-based electronic payment conversion method 800. While FIG. 8 illustrates exemplary operations according to one embodiment, other embodiments may omit, add to, reorder, and/or modify any of the operations shown in FIG. 8. One or more of the operations shown in FIG. 8 may be performed by a payment conversion system such as payment conversion system 102 and/or any implementation thereof.

In operation 802, payment conversion system 102 detects an electronic payment to a recipient such as recipient 112. Operation 802 may be performed in any of the ways described herein, such as by payment conversion system 102 receiving a notification of the electronic payment from electronic payment system 104 or communicating with electronic payment system 104 in any other way to detect the electronic payment processed by electronic payment system 104.

In operation 804, payment conversion system 102 provides a payment notification to the recipient. Operation 804 may be performed in any of the ways described herein, such as by payment conversion system 102 initiating a transmission of the payment notification to a computing device associated with the recipient, such as recipient device 108. In certain examples, payment conversion system 102 accesses a recipient identifier associated with the recipient from electronic payment system 104 and initiates a transmission of the payment notification to the recipient identifier. For example, the recipient identifier may be an MDN of a computing device associated with the recipient. In some examples, the electronic payment may be addressed to the MDN in electronic payment system 104, and payment conversion system 102 may access the MDN and initiate a transmission of an SMS message to the MDN.

The computing device of the recipient may receive and present the payment notification to the recipient. As described herein, the payment notification may include content that notifies the recipient of the electronic payment and informs the recipient about how to convert the electronic payment to physical currency at an ATM such as ATM 106.

The recipient may visit and interact with ATM 106 to request that the electronic payment be converted to physical currency. For example, the recipient may provide user input to ATM 106 to request that the electronic payment be converted to physical currency, such as by selecting an appropriate ATM menu option to initiate the request.

In operation 806, payment conversion system 102 receives, by way of ATM 106, a request to convert an electronic payment to physical currency. Operation 806 may be performed in any of the ways described herein, such as by payment conversion system 102 receiving, from ATM 106, a communication representing a request that has been initiated by the recipient providing user input to ATM 106 to request that an electronic payment be converted to physical currency.

In operation 808, payment conversion system 102 receives a transaction identifier by way of ATM 106. Operation 808 may be performed in any of the ways described herein, such as by payment conversion system 102 prompting, in response to the request to convert an electronic payment to physical currency, the recipient to provide a transaction identifier for the electronic payment. Payment conversion system 102 may provide the prompt in any suitable way, including by providing a graphical user interface view, for display by the ATM, that prompts for user input of a transaction identifier, as described herein. The recipient may input the transaction identifier to ATM 106, and payment conversion system 102 may receive the transaction identifier.

In operation 810, payment conversion system 102 verifies that the received transaction identifier represents the electronic payment. Operation 808 may be performed in any of the ways described herein, such as by payment conversion system 102 querying a data store of electronic payments for an electronic payment with a matching transaction identifier. If a match is found, payment conversion system 102 verifies that the received transaction identifier represents the electronic payment.

In operation 812, payment conversion system 102 generates an access code for the electronic payment. Operation 808 may be performed in any of the ways described herein, such as by payment conversion system 102 generating an access code for the electronic payment in response to payment conversion system 102 verifying the transaction identifier in operation 810. In certain examples, payment conversion system 102 generates the access code by generating a one-time passcode for the electronic payment. Payment conversion system 102 may define a finite lifespan of the one-time passcode, such as by setting an expiration for the one-time passcode.

In operation 814, payment conversion system 102 provides the access code to the recipient. Operation 814 may be performed in any of the ways described herein, such as by payment conversion system 102 initiating a transmission of the access code to a computing device associated with the recipient, such as recipient device 108. In certain examples, payment conversion system 102 initiates a transmission of the access code to the same recipient identifier (e.g., the MDN of the computing device associated with the recipient) that was used to transmit the payment notification in operation 804, such as by initiating a transmission of another SMS message to the MDN.

The computing device of the recipient may receive and present the access code to the recipient. The access code may include content that notifies the recipient of the access code and how to use the access code to continue with the process to convert the electronic payment to physical currency. The recipient may input the access code to ATM 106.

In operation 816, payment conversion system 102 receives the access code by way of the user input to ATM 106. Operation 816 may be performed in any of the ways described herein, such as by payment conversion system 102 receiving the user input representing the access code by way of ATM 106 or receiving a communication representing the access code input to ATM 106.

In operation 818, payment conversion system 102 validates the access code. Operation 818 may be performed in any of the ways described herein, such as by payment conversion system 102 verifying that the access code received by way of ATM 106 matches the access code generated by payment conversion system 102 for the electronic payment.

In operation 820, payment conversion system 102 converts the electronic payment to physical currency. Operation 820 may be performed in any of the ways described herein, such as by payment conversion system 102 performing one or more conversion operations in response to the validating of the access code in operation 818. The operations may include payment conversion system 102 directing ATM 106 to disburse the physical currency.

In certain examples, payment conversion system 102 may be implemented in a distributed architecture in which certain components of payment conversion system 102 are implemented by ATM 106 and certain components of payment conversion system 102 are implemented by a backend system, such as one or more server computing devices communicatively coupled to ATM 106. The backend system may be separate from or an integrated part of electronic payment system 104. In such an implementation, method 800 may be performed by components of payment conversion system 102 implemented by the backend system communicatively coupled to ATM 106, and components of payment conversion system 102 implemented by ATM 106 may be configured to perform complementary operations such that ATM 106 and the backend system together perform an ATM-based electronic payment conversion.

Figure 9:
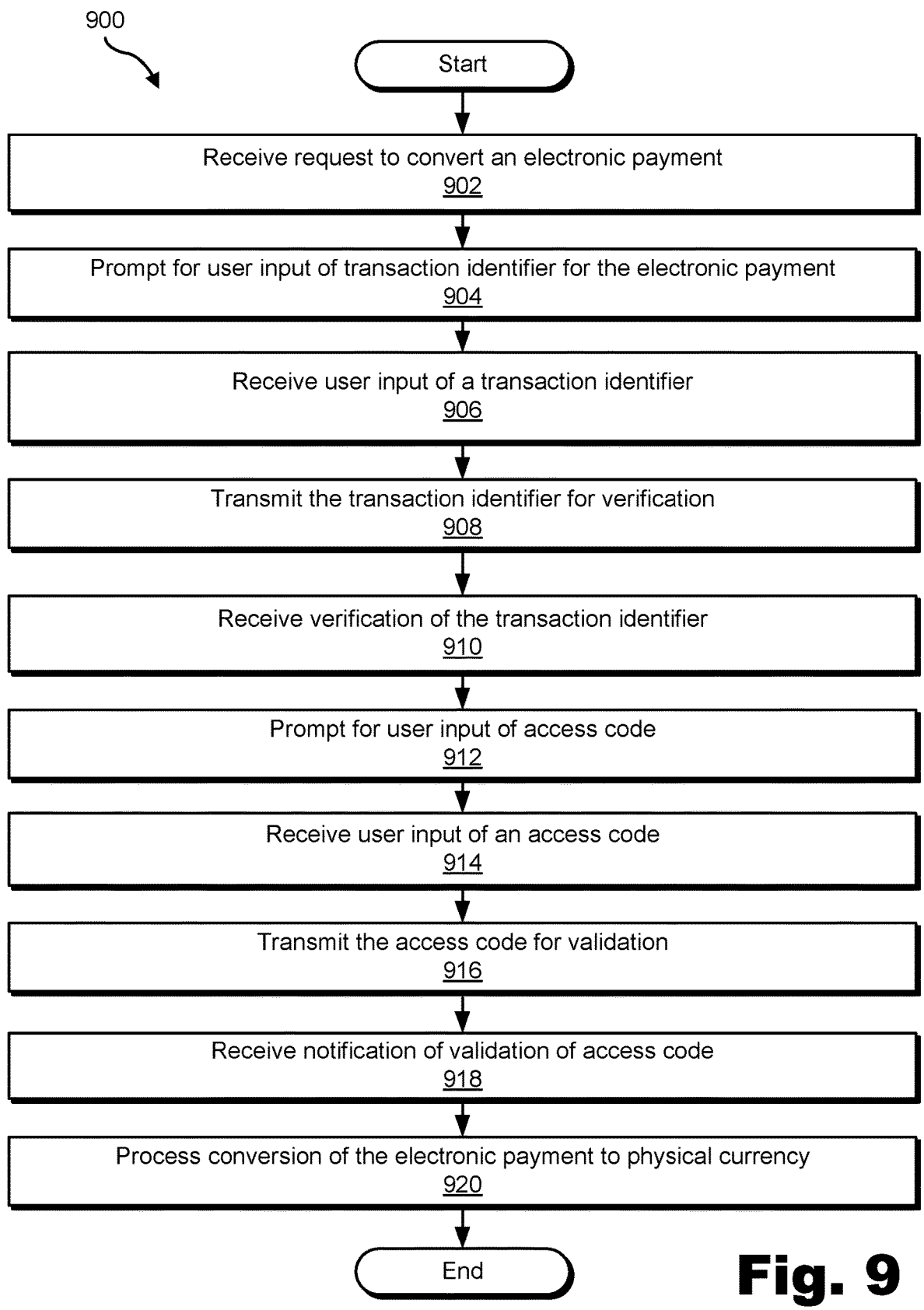
FIG. 9 illustrates another exemplary payment conversion method according to principles described herein.

FIG. 9 illustrates an exemplary ATM-based electronic payment conversion method 900. While FIG. 9 illustrates exemplary operations according to one embodiment, other embodiments may omit, add to, reorder, and/or modify any of the operations shown in FIG. 9. One or more of the operations shown in FIG. 9 may be performed by an ATM such as ATM 106 and/or components of a payment conversion system such as payment conversion system 102 implemented by an ATM.

In operation 902, ATM 106 receives a request to convert an electronic payment. Operation 902 may be performed in any of the ways described herein, such as by ATM 106 receiving a user selection of an ATM menu option to request a conversion of an electronic payment.

In operation 904, ATM 106 prompts for user input of a transaction identifier for the electronic payment. Operation 904 may be performed in any of the ways described herein, such as by ATM 106 displaying graphical user interface view 500 shown in FIG. 5.

In operation 906, ATM 106 receives user input of a transaction identifier. Operation 906 may be performed in any of the ways described herein, such as by ATM 106 receiving user input representing the transaction identifier.

In operation 908, ATM 106 transmits the received transaction identifier to the backend system for verification. Operation 908 may be performed in any of the ways described herein.

In operation 910, ATM 106 receives verification of the transaction identifier from the backend system. The verification may indicate that the backend system maintains a data record for an active electronic payment having a matching transaction identifier. Operation 908 may be performed in any of the ways described herein.

In operation 912, ATM 106 prompts for user input of an access code. Operation 912 may be performed in any of the ways described herein, such as by ATM 106 displaying graphical user interface view 700 shown in FIG. 7. Operation 912 may be performed in response to verification of the transaction identifier.

In operation 914, ATM 106 receives user input of an access code. Operation 914 may be performed in any of the ways described herein, such as by ATM 106 receiving user input representing the access code.

In operation 916, ATM 106 transmits the received access code to the backend system for validation. Operation 916 may be performed in any of the ways described herein.

In operation 918, ATM 106 receives notification of validation of the access code from the backend system. Operation 918 may be performed in any of the ways described herein. The validation of the received access code indicates that the backend system determined that the access code received by ATM 106 matches an access code generated by the backend system for the electronic payment.

In operation 920, ATM 920 processes conversion of the electronic payment to physical currency. Operation 920 may be performed in any of the ways described herein and may include ATM 920 disbursing the physical currency and notifying the backend system of the outcome of the conversion.

Figure 10:
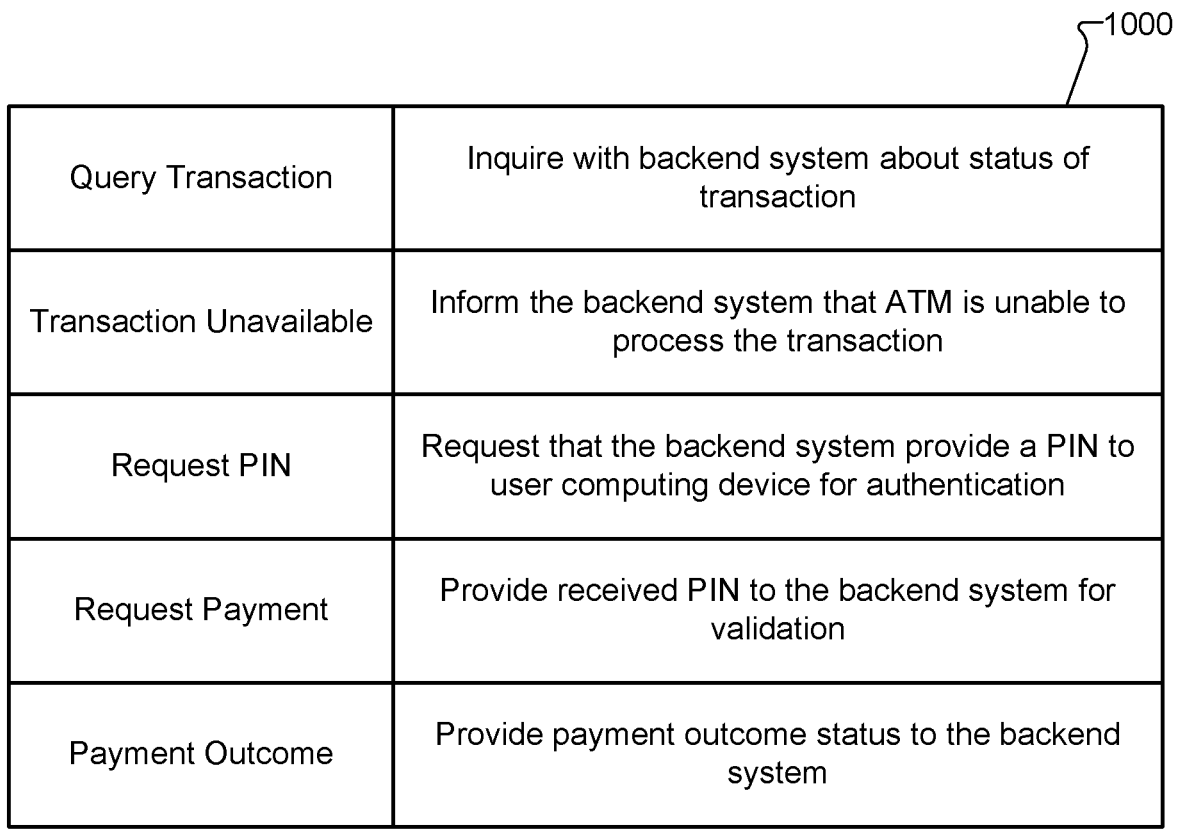
FIG. 10 illustrates an exemplary set of application program interfaces according to principles described herein.

In an implementation of a distributed architecture of payment conversion system 102 in which certain components of payment conversion system 102 are implemented by ATM 106 and certain components of payment conversion system 102 are implemented by a backend system, ATM 106 and the backend system may be configured to communicate using a set of APIs. FIG. 10 illustrates an exemplary set of APIs 1000 that ATM 106 may be configured to use to communicate with the backend system. As shown, the set of APIs 1000 may include a query transaction function, a transaction unavailable function, a request personal identification number (PIN) function, a request payment function, and a payment outcome function.

ATM 106 may call the query transaction function to inquire with the backend system about the status of a transaction. For example, in response to receiving user input of a transaction identifier, ATM 106 may call the query transaction function to provide the transaction identifier to the backend system for verification and may receive a response from the backend system that indicates whether the transaction identifier matches an active electronic payment. An active electronic payment may be an electronic payment that has been processed by electronic payment system 104 and for which virtual funds are associated with the recipient of the electronic payment and are available to be paid out from electronic payment system 104).

A transaction query request sent by ATM 106 may include the transaction identifier and a unique identifier for ATM 106. A response to the transaction query request may include any information about the status of the transaction identifier and any information about an electronic payment having a matching transaction identifier.

ATM 106 may call the transaction unavailable function to inform the backend system that ATM 106 is unable to process the transaction. For example, ATM 106 may be unable to process the transaction because of a lack of physical currency at ATM 106 for the transaction, a lack of proper denominations of physical currency for the transaction, or because of another detected limitation of ATM 106. A transaction unavailable message sent by ATM 106 may include the transaction identifier, the unique identifier for ATM 106, and a reason code and/or a description indicating why ATM 106 is unable to process the transaction.

ATM 106 may call the request PIN function to request that the backend system provide a PIN to the recipient of the electronic payment for authentication of the recipient. ATM 106 may call the request PIN function in response to receiving a query response from the backend system indicating verification of the transaction identifier. A request PIN request sent by ATM 106 may include the transaction identifier, a unique identifier for ATM 106, and information about the sender and/or recipient of the electronic payment that has been accessed from the backend system.

ATM 106 may call the request payment function to provide a PIN received by ATM 106 to the backend system for validation. ATM 106 may receive a response from the backend system indicating whether the PIN is valid.

A request payment message sent by ATM 106 may include the transaction identifier, the PIN received by ATM 106, and the unique identifier for ATM 106. A response received by ATM 106 may include a notification indicating whether the PIN is valid and any information that may be used by ATM 106 to process the requested payment conversion.

ATM 106 may call the payment outcome function to provide a payment outcome status notification to the backend system. The payment outcome status notification may indicate the status of the electronic payment conversion so that the backend may perform appropriate operations. For example, the backend system may mark the electronic payment as paid when ATM 106 successfully disburses physical currency for the payment, may leave the electronic payment in an available-to-pay status when ATM 106 does not successfully distribute physical currency for the payment, or may place the electronic payment in an interim status to await further processing by ATM 106.

A payment outcome message sent by ATM 106 may include the transaction identifier, a payment outcome status indicator, a description of a failure statue, the unique identifier for ATM 106, a unique reference number for the ATM transaction, and/or any other information about the transaction.

Figure 11:
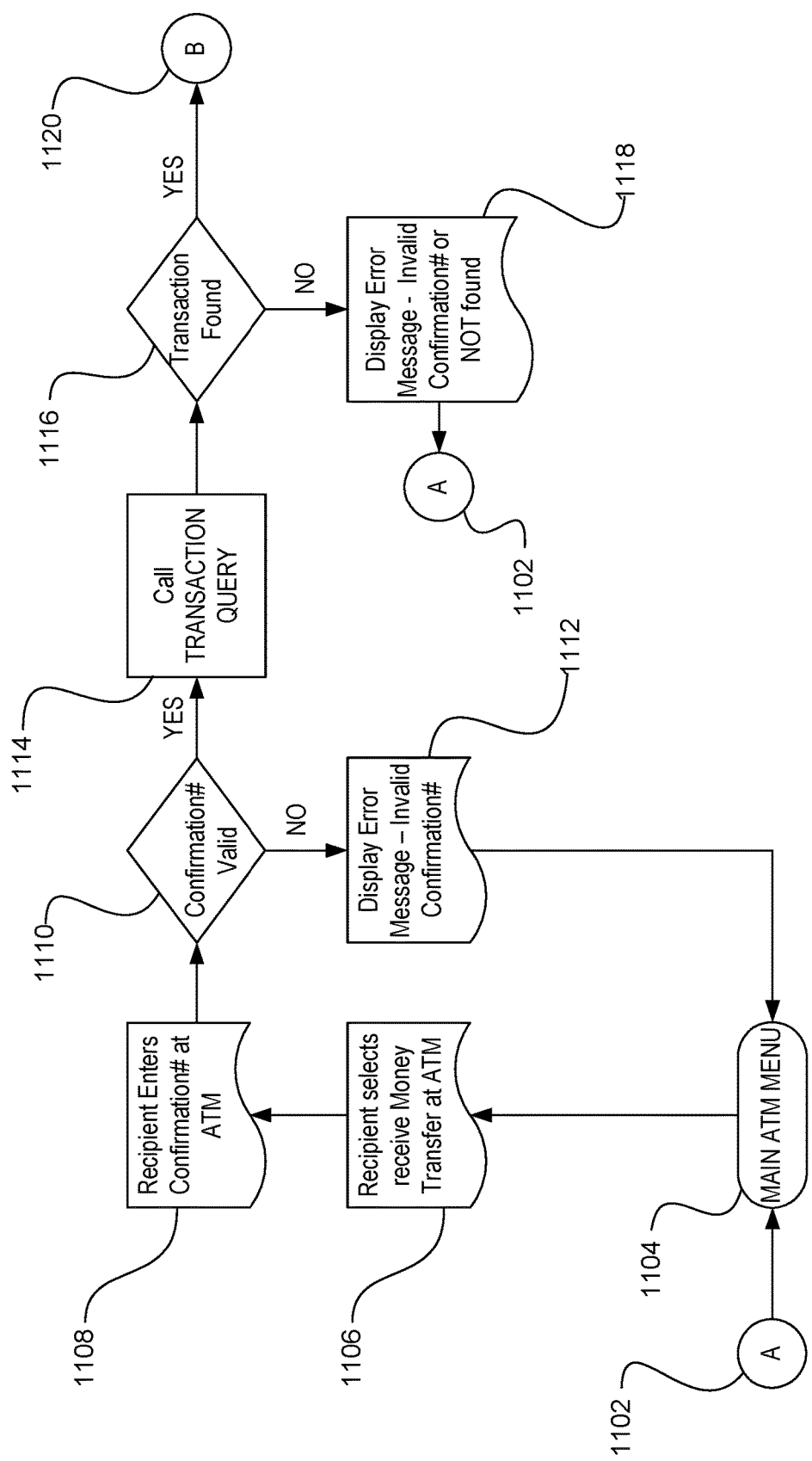
FIGS. 11-13 illustrate another exemplary payment conversion method according to principles described herein.
Figure 12:
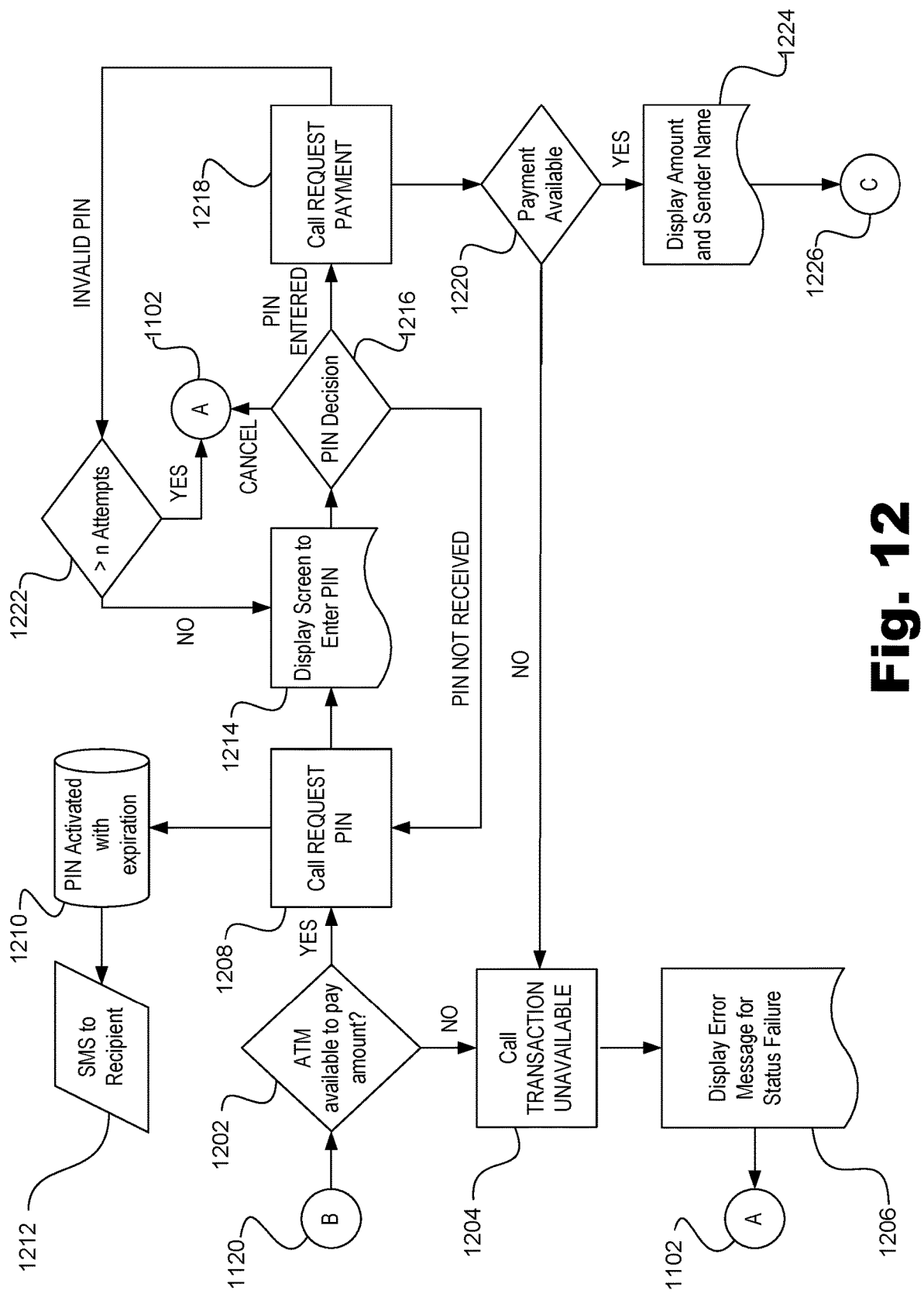
Figure 13:
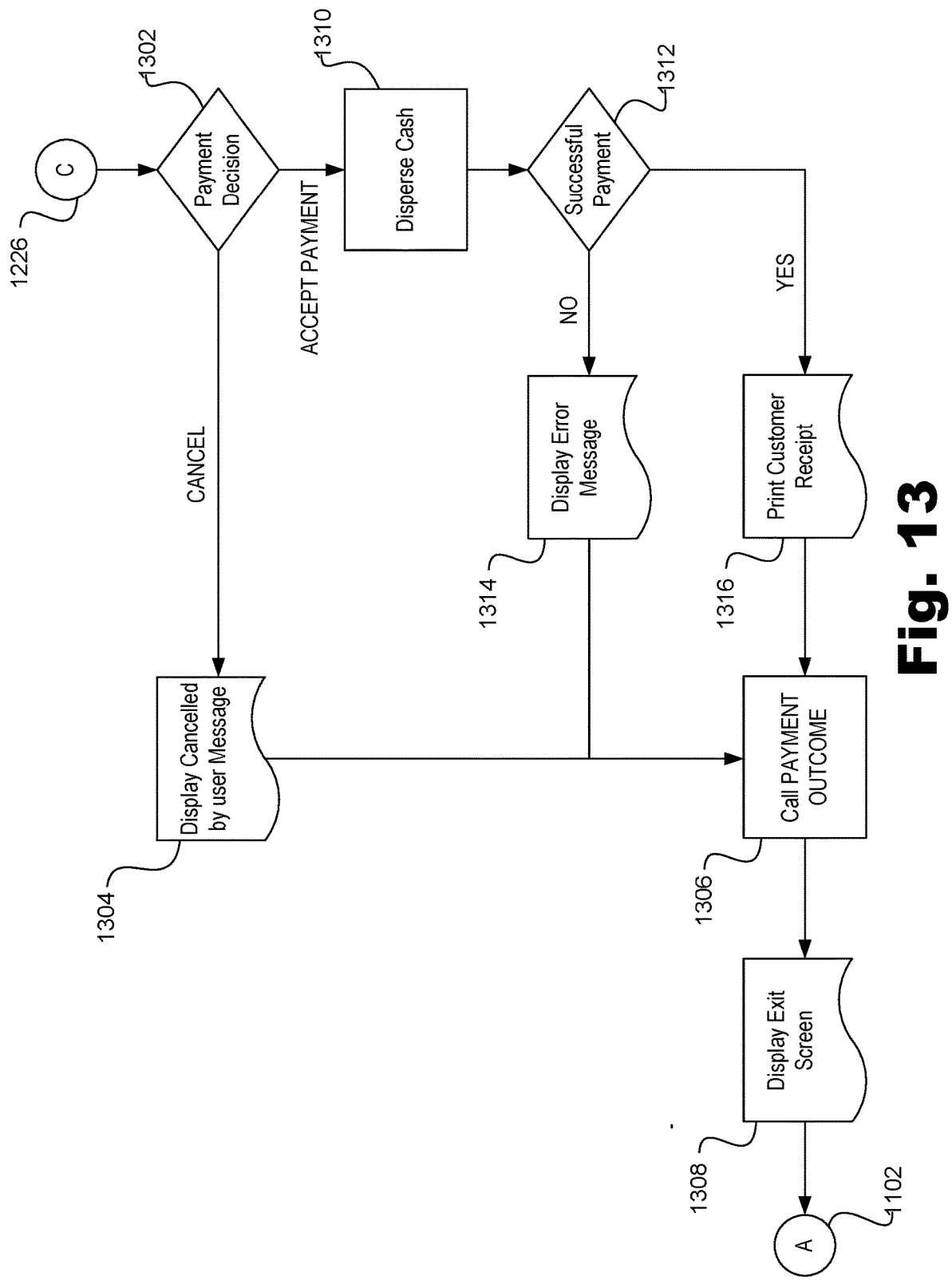

FIGS. 11-13 illustrate an exemplary ATM-based electronic payment conversion method in which the set of APIs 1000 shown in FIG. 10 are used. While FIGS. 11-13 illustrate exemplary operations according to one embodiment, other embodiments may omit, add to, reorder, and/or modify any of the operations shown in FIGS. 11-13. One or more of the operations shown in FIGS. 11-13 may be performed by components of payment conversion system 102 that are implemented by ATM 106 and a backend system in a distributed architecture.

Turning to FIG. 11, a circle 1102 labeled "A" represents a starting point that precedes or includes ATM 106 displaying a main ATM menu at operation 1104. At operation 1106, ATM 106 detects a user selection of a menu option to request receipt of payment of an electronic payment at ATM 106. At operation 1108, ATM 106 receives user input indicating a transaction identifier in the form of a confirmation number.

At operation 1110, ATM 106 determines whether the received confirmation number is valid, such as by determining that the confirmation number includes an appropriate quantity of numbers and/or other characters (e.g., that the entered confirmation number includes an 11-digit number). If ATM 106 determines that the received confirmation number is not valid, ATM 106 performs operation 1112 by displaying an error message indicating an invalid confirmation number and returns to displaying the main ATM menu at operation 1104. If ATM 106 determines that the received confirmation number is valid, ATM 106 performs operation 1114 by calling the transaction query function to inquire with the backend system about the status of a transaction associated with the confirmation number.

At operation 1116, ATM 106 determines the status of the transaction associated with the confirmation number based on a response to the transaction query. If no matching transaction is found, ATM 106 performs operation 1118 by displaying an error message indicating an invalid or unfound confirmation number and returns to starting point "A" 1102 and displays the main ATM menu at operation 1104. If a valid, matching transaction is found, ATM 106 performs operation 1202 shown in FIG. 12. The transition from operation 1116 of FIG. 11 to operation 1202 of FIG. 12 is illustrated by circle 1120 labeled "B" in FIG. 11 and FIG. 12.

In operation 1202, ATM 106 determines whether ATM 106 is able to process the requested transaction. For example, ATM 106 may determine whether ATM 106 has sufficient physical currency in appropriate denominations to convert the electronic payment to physical currency and disburse the physical currency. If ATM 106 is unable to process the transaction, at operation 1204 ATM 106 calls the transaction unavailable function to inform the backend system that ATM 106 is unable to process the transaction. At operation 1206, ATM 106 displays an error message indicating that ATM 106 is unable to process the transaction. ATM 106 may also display alternative options along with the error message, such as by recommending another ATM for the transaction.

Returning to operation 1202, if ATM 106 determines that ATM 106 is able to process the transaction, ATM 106 calls the request PIN function at operation 1208 to request that the backend system provide a PIN to the recipient of the electronic payment for authentication of the recipient. At operation 1210, the backend system activates a PIN (e.g., a one-time passcode) with a defined expiration. At operation 1212, the backend system initiates a transmission of an SMS message containing the PIN to the recipient of the electronic payment, such as to an MDN indicated in the electronic payment (e.g., the MDN of a computing device of the recipient of the electronic payment).

After calling the request PIN function in operation 1208, ATM 106 displays, in operation 1214, a screen prompting a user of ATM 106 to enter the PIN. In operation 1216, ATM 106 makes a PIN decision based on user input provided while the PIN prompt screen is displayed.

If no PIN is received within a predetermined time period, ATM 106 may again call the request PIN function at operation 1208, display the PIN prompt screen at operation 1214, and making a PIN decision at operation 1216.

If a cancel option is selected while the PIN prompt screen is displayed, ATM 106 may return to starting point 1102 and display the main ATM menu at operation 1104.

If a PIN is received, in operation 1218 ATM 106 calls the request payment function to provide the received PIN to the backend system for validation and receives a response from the backend system indicating whether the PIN is valid.

If, at operation 1218, ATM 106 determines that the received PIN is invalid, in operation 1222 ATM 106 determines whether a maximum number of PIN attempts has been reached. If the maximum has been reached, ATM 106 may return processing to starting point 1102 and display the main ATM menu at operation 1104. If the maximum has not been reached, ATM 106 returns processing to operation 1214 and displays the PIN prompt screen.

If, at operation 1218, ATM 106 determines that the received PIN is valid, in operation 1220 ATM 106 determines whether ATM 106 is able to process the transaction. If, at operation 1220, ATM 106 determines that ATM 106 is unable to process the transaction, ATM 106 calls the transaction unavailable function at operation 1204, displays an error message indicating that ATM 106 is unable to process the transaction at operation 1206, and returns processing to starting point 1102 and displays the main ATM menu at operation 1104.

If, at operation 1220, ATM 106 determines that ATM 106 is able to process the transaction, ATM 106 displays an amount of the electronic payment and an identifier of the sender of the electronic payment in operation 1224. In operation 1224, ATM 106 may also provide options for the user of ATM 106 to cancel or continue with the transaction.

ATM 106 then performs operation 1302 shown in FIG. 13 to determine a payment decision. The transition from operation 1224 of FIG. 12 to operation 1302 of FIG. 13 is illustrated by circle 1226 labeled "C" in FIG. 12 and FIG. 13.

If the payment decision at operation 1302 is to cancel the transaction, ATM 106 displays a cancelation message in operation 1304, calls the payment output function to provide a payment outcome status notification to the backend system at operation 1306 (e.g., a canceled payment status in this case), displays an exit screen at operation 1308, and returns processing to starting point 1102 and displays the main ATM menu at operation 1104.

If the payment decision at operation 1302 is to continue with the transaction, ATM 106 dispenses a cash payment in operation 1310. In operation 1312, ATM 106 determines whether the payment is successful. If the payment is unsuccessful, ATM 106 displays an error message at operation 1314, calls the payment output function to provide a payment outcome status notification to the backend system at operation 1306 (e.g., an unsuccessful payment status in this case), displays an exit screen at operation 1308, and returns processing to starting point 1102 and displays the main ATM menu at operation 1104. If the payment is successful, ATM 106 provides (e.g., prints) a customer receipt at operation 1316, calls the payment output function to provide a payment outcome status notification to the backend system at operation 1306 (e.g., a successful payment status in this case), displays an exit screen at operation 1308, and returns processing to starting point 1102 and displays the main ATM menu at operation 1104.

Payment conversion system 102 may include or be implemented by at least one physical computing device and may perform the various operations of payment conversion system 102 described herein by directing one or more components of the physical computing device to perform the operations. Accordingly, operations described herein as being performed by payment conversion system 102 may be performed, in certain implementations, by payment conversion system 102 directing one or more components of the physical computing device to perform the operations. Such operations may also be referred to as being performed by the physical computing device.

Figure 14:
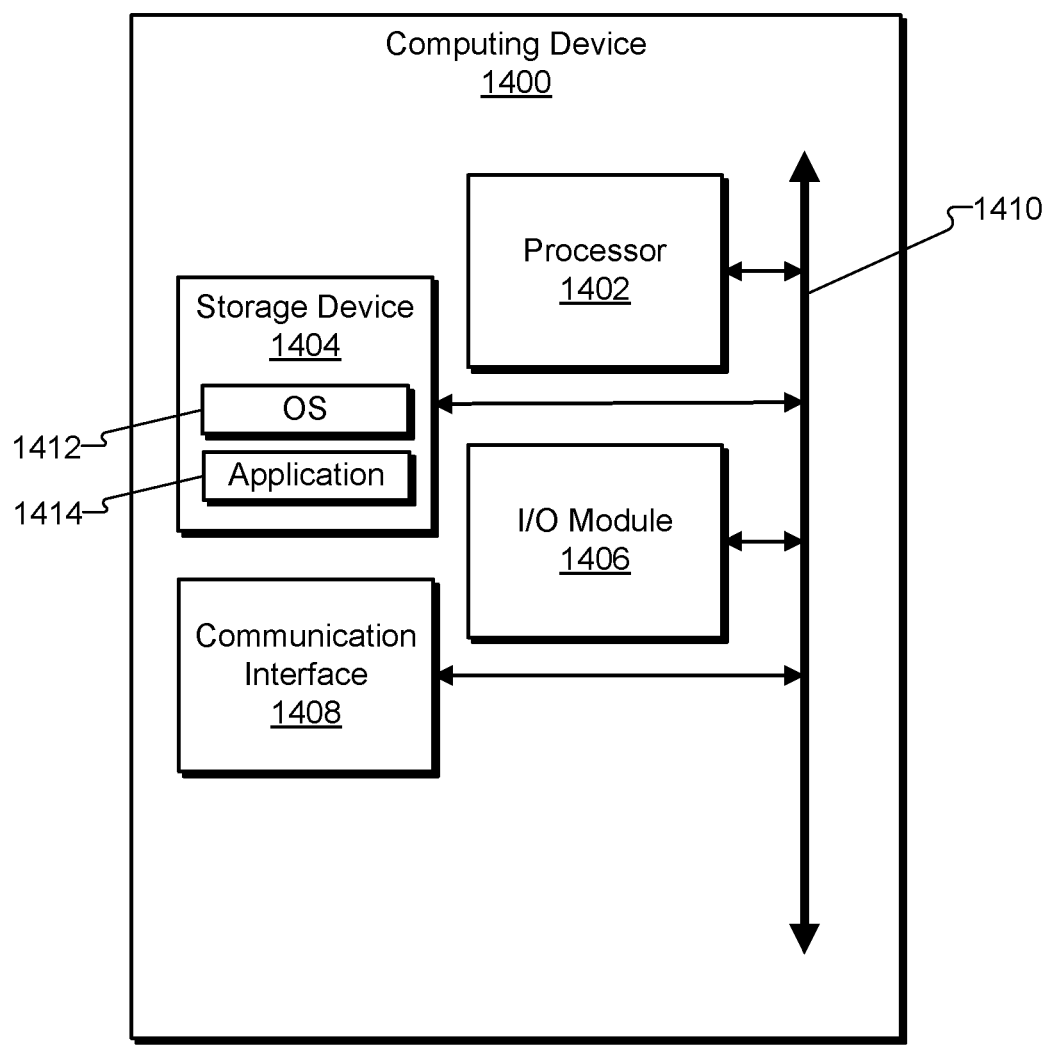
FIG. 14 illustrates an exemplary computing device according to principles described herein.

FIG. 14 illustrates an exemplary physical computing device 1400 ("computing device 1400") specifically configured to perform one or more of the operations described herein. As shown in FIG. 14, computing device 1400 may include a processor 1402, a storage device 1404, an input/output ("I/O") module 1406, and a communication interface 1408 communicatively connected to one another via a communication infrastructure 1410. While an exemplary computing device 1400 is shown in FIG. 14, the components illustrated in FIG. 14 are not intended to be limiting. Additional or alternative components may be used in other embodiments.

Processor 1402 generally represents any type or form of physical processing unit capable of processing data or interpreting, executing, and/or directing execution of one or more of the instructions, processes, and/or operations described herein. Processor 1402 may direct execution of operations in accordance with an operating system ("OS") 1412 and one or more applications, such as an application 1414, or other computer-executable instructions stored in storage device 1404 or another computer-readable medium.

Storage device 1404 may include one or more data storage media (e.g., a non-transitory computer-readable medium), devices, or configurations and may employ any type, form, and combination of data storage media and/or devices. For example, storage device 1404 may include, but is not limited to, a hard drive, network drive, flash drive, magnetic disc, optical disc, RAM, dynamic RAM, solid-state drive, other non-volatile and/or volatile data storage units, or a combination or sub-combination thereof. Electronic data, including data described herein, may be temporarily and/or permanently stored in storage device 1404. In some examples, data may be arranged in one or more databases residing within storage device 1404.

In certain embodiments, one or more components of payment conversion system 102 may be implemented as application 1414 installed on computing device 1400. Data representative of installed executable application 1414 may be stored within storage device 1404 and configured to direct processor 1402 (and thus any of the components of computing device 1400) to perform one or more of the operations described herein.

I/O module 1406 may include one or more I/O modules configured to receive user input and provide user output. One or more I/O modules may be used to receive input by way of a user interface provided by computing device 1400. I/O module 1406 may include any hardware, firmware, software, or combination thereof supportive of input and output capabilities. For example, I/O module 1406 may include hardware and/or software for capturing user input, including, but not limited to, a keyboard or keypad, a touchscreen component (e.g., a touchscreen display), a receiver (e.g., an RF or infrared receiver), motion sensors, a microphone, and/or one or more input buttons.

I/O module 1406 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation on a display screen (e.g., to user computing device 108 for display on a display screen of user computing device 108). The graphical data may be representative of one or more graphical user interfaces and/or any other graphical content as may serve a particular implementation, including content of any of the exemplary graphical user interface views described herein.

Communication interface 1408 may be configured to communicate with one or more other computing devices separate from computing device 1400. Examples of communication interface 1408 include, without limitation, a wired network interface (such as a network interface card), a wireless network interface (such as a wireless network interface card), a modem, an audio/video connection, a radio frequency transceiver, and any other suitable interface.

For a distributed architecture in which components of payment conversion system 102 are distributed across an ATM and a backend computing system, physical computing device 1400 may represent the ATM or a backend physical computing device. In examples in which computing device 1400 represents a backend computing device, application 1414 may include backend components of payment conversion system 102. In examples in which computing device 1400 represents an ATM, application 1414 may include ATM-based components of payment conversion system 102, and I/O module 1406 may include ATM input and output mechanism such as a physical currency dispenser, a keypad, menu buttons, display screen, etc. of an ATM.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A computer-implemented system comprising:
at least one physical computing device that is communicatively coupled, by way of a network, to an automated teller machine (ATM) and to an electronic payment system, and that:
  detects, in the electronic payment system, an electronic payment of an amount of virtual funds from a sender registered with the electronic payment system to a recipient, wherein the recipient has not registered with the electronic payment system and the electronic payment in the electronic payment system is addressed to a unique recipient identifier of the recipient;
  determines, from the electronic payment system, the unique recipient identifier to which the electronic payment is addressed in the electronic payment system;
  initiates, in response to the detection of the electronic payment in the electronic payment system and using the unique recipient identifier to which the electronic payment is addressed in the electronic payment system, a transmission of a payment notification to the unique recipient identifier of the recipient, the payment notification including a transaction identifier for presentation by a computing device of the recipient and a link to information about ATM locations at which the recipient may convert the electronic payment to physical currency, the information about the ATM locations including a location of the ATM;
  receives a notification verifying that the ATM has sufficient physical currency funds at the location to disburse the physical currency for the amount of virtual funds;
  receives, by way of user input to the ATM, the transaction identifier;
  verifies that the transaction identifier represents, in the electronic payment system, the electronic payment of the amount of virtual funds from the sender to the recipient by way of the electronic payment system;
  sends, to the ATM, a notification of the verification of the transaction identifier;
  receives, from the ATM, an access code request generated in response to the notification of the verification of the transaction identifier;
  generates, based on the access code request, an access code for the electronic payment;
  initiates a transmission of the access code to the computing device of the recipient;
  receives, by way of additional user input to the ATM, the access code for the electronic payment;
  validates the received access code for the electronic payment; and
  directs, in response to the validation of the received access code, the ATM to disburse the amount of virtual funds of the electronic payment in physical currency to the recipient.

2. The computer-implemented system of claim 1, wherein the unique recipient identifier is a mobile directory number (MDN) of the computing device of the recipient.

3. The computer-implemented system of claim 2, wherein the at least one physical computing device initiates the transmission of the payment notification to the MDN of the computing device of the recipient by initiating a transmission of a short messaging service (SMS) message containing the payment notification to the MDN of the computing device of the recipient.

4. The computer-implemented system of claim 2, wherein the at least one physical computing device initiates the transmission of the access code to the computing device of the recipient by initiating a transmission of a short messaging service (SMS) message containing the access code to the MDN of the computing device of the recipient.

5. The computer-implemented system of claim 1, wherein the electronic payment system is a mobile wallet system configured to provide the electronic payment as a mobile wallet payment to the recipient that is not registered with the electronic payment system.

6. The computer-implemented system of claim 1, wherein the amount of virtual funds transferred from an account of the sender to a temporary account established by the electronic payment system to facilitate the recipient that is not registered with the electronic payment system receiving the electronic payment.

7. The computer-implemented system of claim 1, wherein:
  the electronic payment system is included in a plurality of electronic payment systems;
  each electronic payment system included in the plurality of electronic payment systems is operated by a different organization; and
  the at least one physical computing device further communicates with each electronic payment system included in the plurality of electronic payment systems to provide an open platform that concurrently supports detecting electronic payments from multiple different electronic payment systems.

8. The computer-implemented system of claim 1, wherein the payment notification indicates how to convert the electronic payment to physical currency.

9. A system comprising:
an automated teller machine (ATM) that is communicatively coupled, by way of a network, to a payment conversion system, and that:
  receives user input of a transaction identifier;
  verifies, based on the transaction identifier, that the ATM has sufficient funds to disburse physical currency for an amount of virtual funds associated with the transaction identifier;
  transmits the transaction identifier to the payment conversion system for verification that the transaction identifier represents, in an electronic payment system, an electronic payment, by way of the electronic payment system, of the amount of virtual funds from a sender that is registered with the electronic payment system to a recipient, wherein the recipient has not registered with the electronic payment system;
  receives, from the payment conversion system, a notification of the verification of the transaction identifier;
  in response to the notification of the verification of the transaction identifier, transmits an access code request to the payment conversion system, the access code request configured to cause the payment conversion system to generate and provide the access code to a computing device of the recipient for presentation to the recipient;
  in response to the notification, displays a graphical user interface view prompting for input of an access code for the electronic payment;

receives additional user input of the access code for the electronic payment;

transmits the access code to the payment conversion system for validation;

receives, from the payment conversion system, a notification that the access code is valid; and disburses, in response to the notification that the access code is valid, the amount of virtual funds of the electronic payment in physical currency to the recipient, wherein the electronic payment is referenced in a payment notification that is transmitted to the recipient and that includes a link to information about ATM locations at which the recipient may convert the electronic payment to the physical currency, the information about the ATM locations including a location of the ATM.

10. The system of claim 9, wherein the ATM:

receives a request to convert the electronic payment to the physical currency; and in response to the request, displays a graphical user interface view prompting for input of the transaction identifier for the electronic payment.

11. The system of claim 9, wherein the payment conversion system is configured to provide the access code to the computing device of the recipient by initiating a transmission of a message to a unique recipient identifier of the recipient.

12. The system of claim 11, wherein the unique recipient identifier of the recipient comprises at least one of an email address, a messaging service address, or a social media platform address of the recipient who has not registered with the electronic payment system.

13. The system of claim 11, wherein:

the unique recipient identifier of the recipient is a mobile directory number (MDN) of the computing device of the recipient; and the payment conversion system is configured to provide the access code to the computing device of the recipient by initiating a transmission of a short messaging service (SMS) message containing the access code to the MDN of the computing device.

14. The system of claim 9, wherein the ATM implements a set of application program interfaces (APIs) to interface with the payment conversion system, the set of APIs comprising:

a query transaction function to inquire about a status of the received transaction identifier;

a request access code function to request that the payment conversion system generate and provide the access code to a computing device of the recipient; and a request payment function to provide the received access code to the payment conversion system for validation.

15. A method comprising:

detecting, by a computer-implemented system and in an electronic payment system, an electronic payment of an amount of virtual funds from a sender registered with the electronic payment system to a recipient, wherein the recipient has not registered with the electronic payment system and the electronic payment in the electronic payment system is addressed to a unique recipient identifier of the recipient;

determining, by the computer-implemented system, the unique recipient identifier to which the electronic payment is addressed in the electronic payment system;

initiating, by the computer-implemented system in response to the detection of the electronic payment in the electronic payment system and using the unique recipient identifier to which the electronic payment is addressed in the electronic payment system, a transmission of a payment notification to the unique recipient identifier of the recipient, the payment notification including a transaction identifier for presentation by a computing device of the recipient and a link to information about automated teller machine (ATM) locations at which the recipient may convert the electronic payment to physical currency, the information about the ATM locations including a location of an ATM;

verifying, by the computer-implemented system, that the ATM has sufficient physical currency funds at the location to disburse the physical currency for the amount of virtual funds;

receiving, by the computer-implemented system and by way of user input tothe ATM, the transaction identifier;

verifying, by the computer-implemented system, that the transaction identifier represents, in the electronic payment system, the electronic payment of the amount of virtual funds from the sender to the recipient by way of the electronic payment system;

sending, by the computer-implemented system to the ATM, a notification of the verification of the transaction identifier;

receiving, by the computer-implemented system from the ATM, an access code request generated in response to the notification of the verification of the transaction identifier;

generating, by the computer-implemented system based on the access code request, an access code for the electronic payment;

initiating, by the computer-implemented system, a transmission of the access code to the computing device of the recipient;

receiving, by the computer-implemented system and by way of additional user input to the ATM, the access code for the electronic payment;

validating, by the computer-implemented system, the received access code for the electronic payment; and directing, by the computer-implemented system and in response to the validating of the received access code for the electronic payment, the ATM to disburse the amount of virtual funds of the electronic payment in physical currency to the recipient.

16. The method of claim 15, wherein the unique recipient identifier is a mobile directory number (MDN) of the computing device of the recipient.

17. The method of claim 16, wherein the initiating of the transmission of the payment notification to the computing device of the recipient comprises initiating a transmission of a short messaging service (SMS) message containing the payment notification to the MDN of the computing device of the recipient.

18. The method of claim 16, wherein the initiating of the transmission of the access code to the computing device of the recipient comprises initiating a transmission of a short messaging service (SMS) message containing the access code to the MDN of the computing device of the recipient.

19. The method of claim 15, wherein the unique recipient identifier of the recipient comprises at least one of an email address, a messaging service address, or a social media platform address of the recipient who has not registered with the electronic payment system.

20. The method of claim 15, embodied as computer-executable instructions on at least one non-transitory computer-readable medium.

* * * * *